(12) United States Patent
Wobschall

(10) Patent No.: US 10,342,370 B2
(45) Date of Patent: Jul. 9, 2019

(54) BEVERAGE-VESSEL HOLDER AND METHOD

(71) Applicant: LaVern N. Wobschall, Owatonna, MN (US)

(72) Inventor: LaVern N. Wobschall, Owatonna, MN (US)

(*) Notice: Subject to any disclaimer, the term of this patent is extended or adjusted under 35 U.S.C. 154(b) by 0 days.

(21) Appl. No.: 15/894,845

(22) Filed: Feb. 12, 2018

(65) Prior Publication Data

US 2018/0177317 A1 Jun. 28, 2018

Related U.S. Application Data

(62) Division of application No. 29/556,395, filed on Feb. 29, 2016, now Pat. No. Des. 809,871.

(51) Int. Cl.
*A47K 1/08* (2006.01)
*A47G 23/02* (2006.01)
*B60N 3/10* (2006.01)
A47G 29/087 (2006.01)
F16B 2/22 (2006.01)
F16B 2/24 (2006.01)

(52) U.S. Cl.
CPC ......... *A47G 23/0225* (2013.01); *B60N 3/101* (2013.01); *A47G 29/087* (2013.01); *F16B 2/22* (2013.01); *F16B 2/241* (2013.01)

(58) Field of Classification Search
CPC ............ A47G 23/0216; A47G 23/0225; A47G 29/087; B60N 3/101; F16B 2/22; F16B 2/241

USPC ............. 248/314, 346.01, 309.4, 313, 316.6, 248/316.7, 316.8; D8/71
See application file for complete search history.

(56) References Cited

U.S. PATENT DOCUMENTS

| | | | |
|---|---|---|---|
| 3,872,868 A * | 3/1975 | Kline | A61J 1/05 128/DIG. 24 |
| 3,982,716 A * | 9/1976 | Trees | A61M 5/1417 248/309.4 |
| 4,278,225 A * | 7/1981 | Phelps | A61J 1/06 248/311.3 |
| 4,860,895 A | 8/1989 | Iaslovits | |
| 4,957,260 A * | 9/1990 | Shelley | A47K 5/18 141/352 |
| 6,059,138 A | 5/2000 | Labruyere | |
| 6,126,256 A | 10/2000 | Doces, II | |
| 6,357,713 B1 * | 3/2002 | Bebow | F16M 13/02 248/300 |
| 7,131,545 B1 | 11/2006 | Grogan | |
| 7,594,637 B2 | 9/2009 | Krueger | |
| 8,840,078 B2 | 9/2014 | DeWald | |

* cited by examiner

*Primary Examiner* — Gwendolyn W Baxter
(74) *Attorney, Agent, or Firm* — Charles A. Lemaire; Jonathan M. Rixen; Lemaire Patent Law Firm, P.L.L.C.

(57) ABSTRACT

A beverage-vessel holder that includes a vessel support structure from which a first part of the beverage vessel is hung, and a resilient member that forms a plurality of contact points that press against a corresponding number of locations on a second part of the beverage vessel to gently and firmly hold the beverage vessel in place. One particular use is for holding beverage vessels, such as wine glasses, brandy snifters, or coffee mugs, in a mobile dwelling such as an aircraft, boat or recreational vehicle.

22 Claims, 31 Drawing Sheets

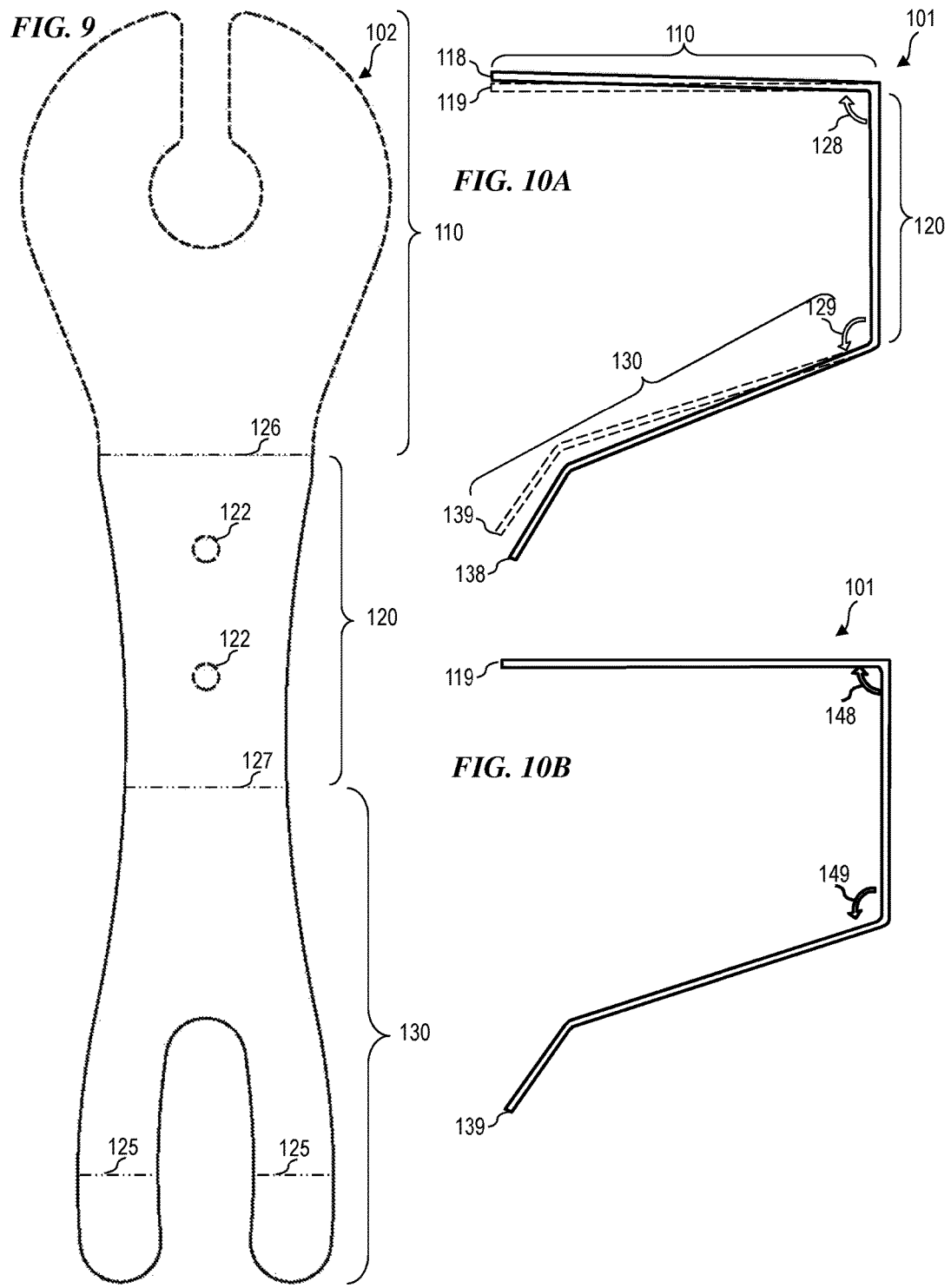

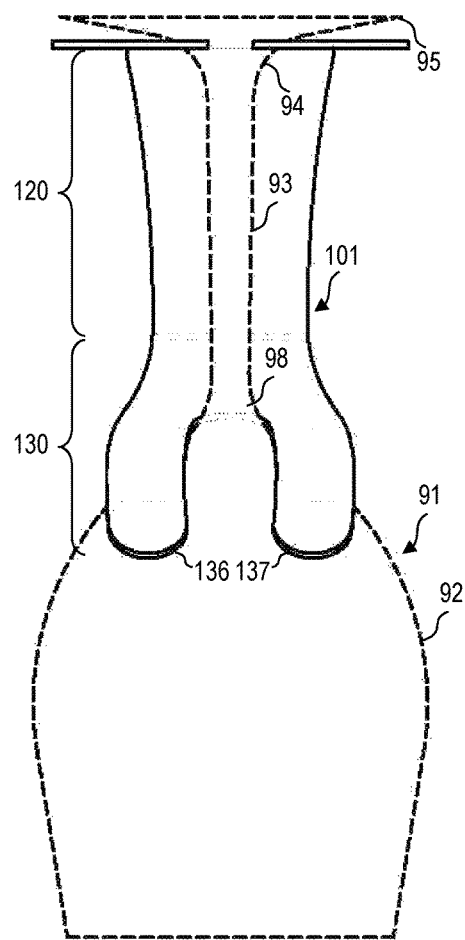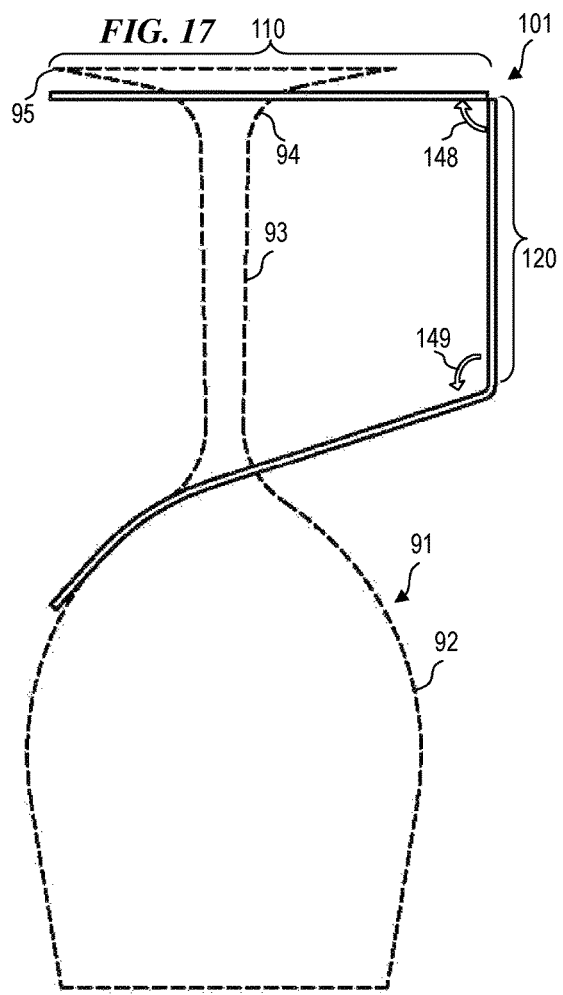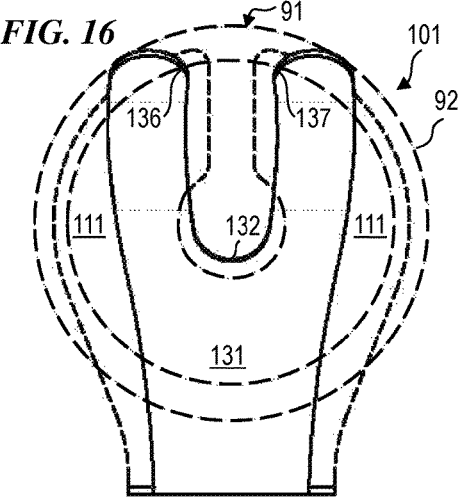

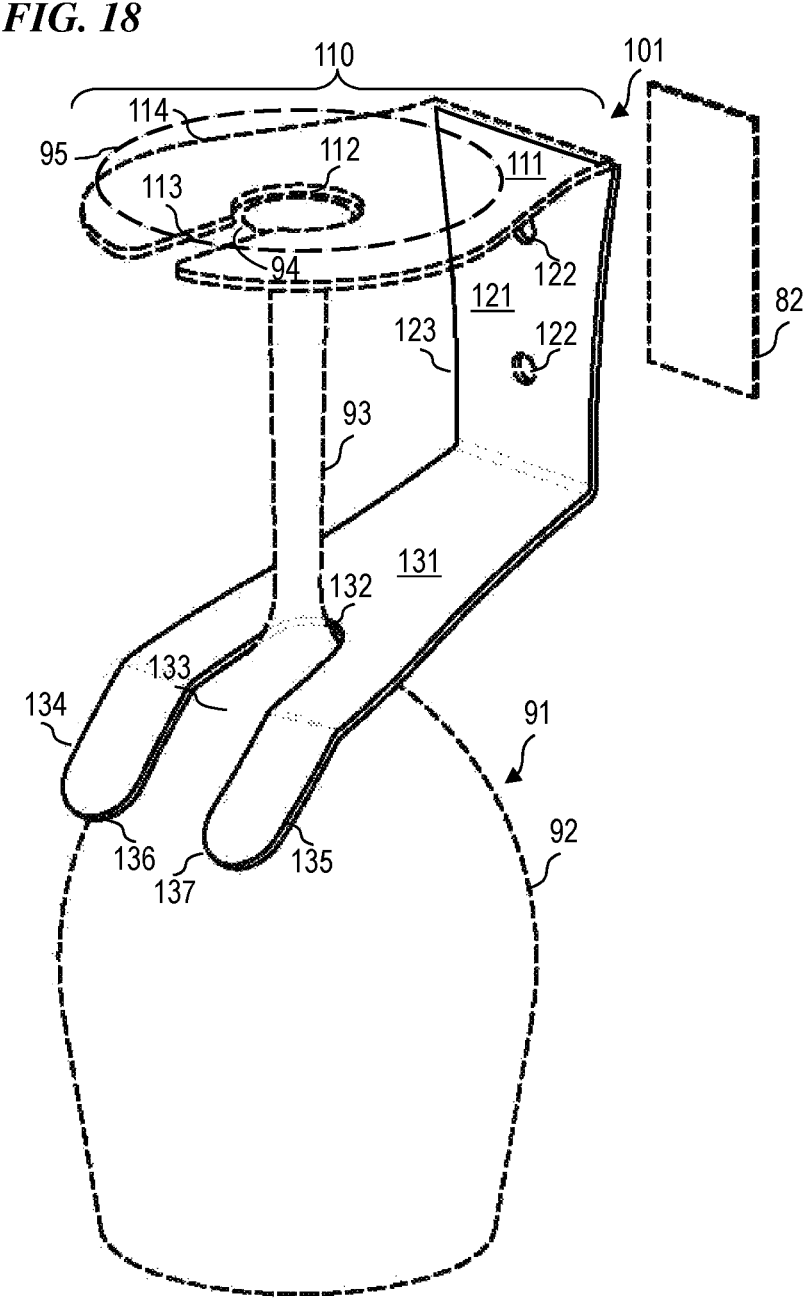

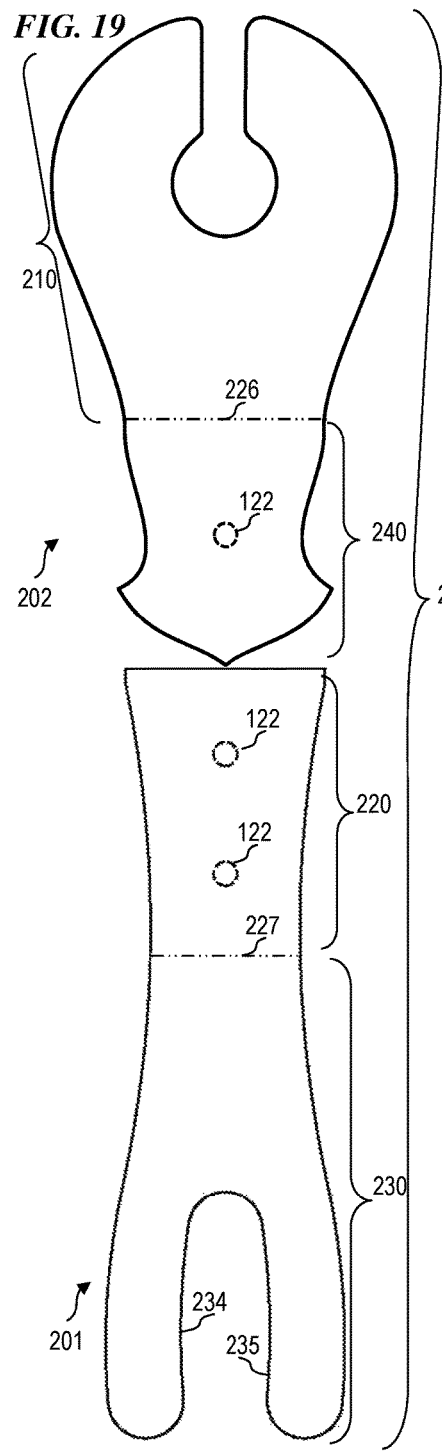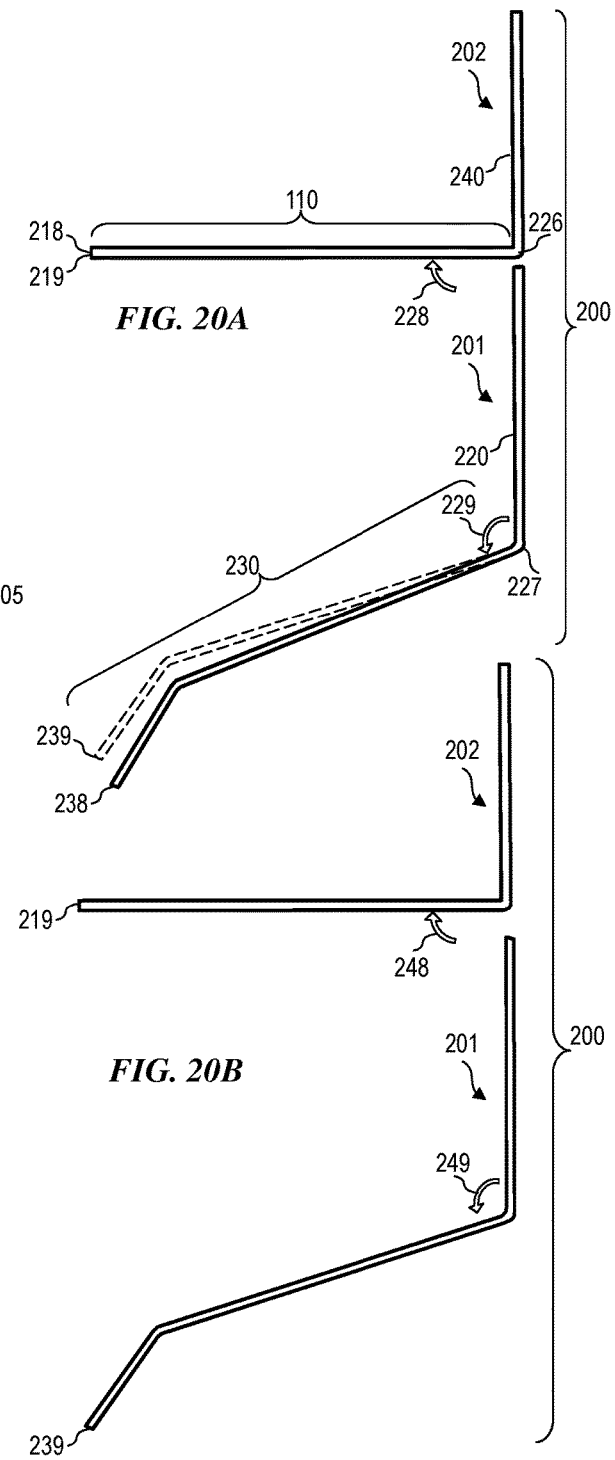

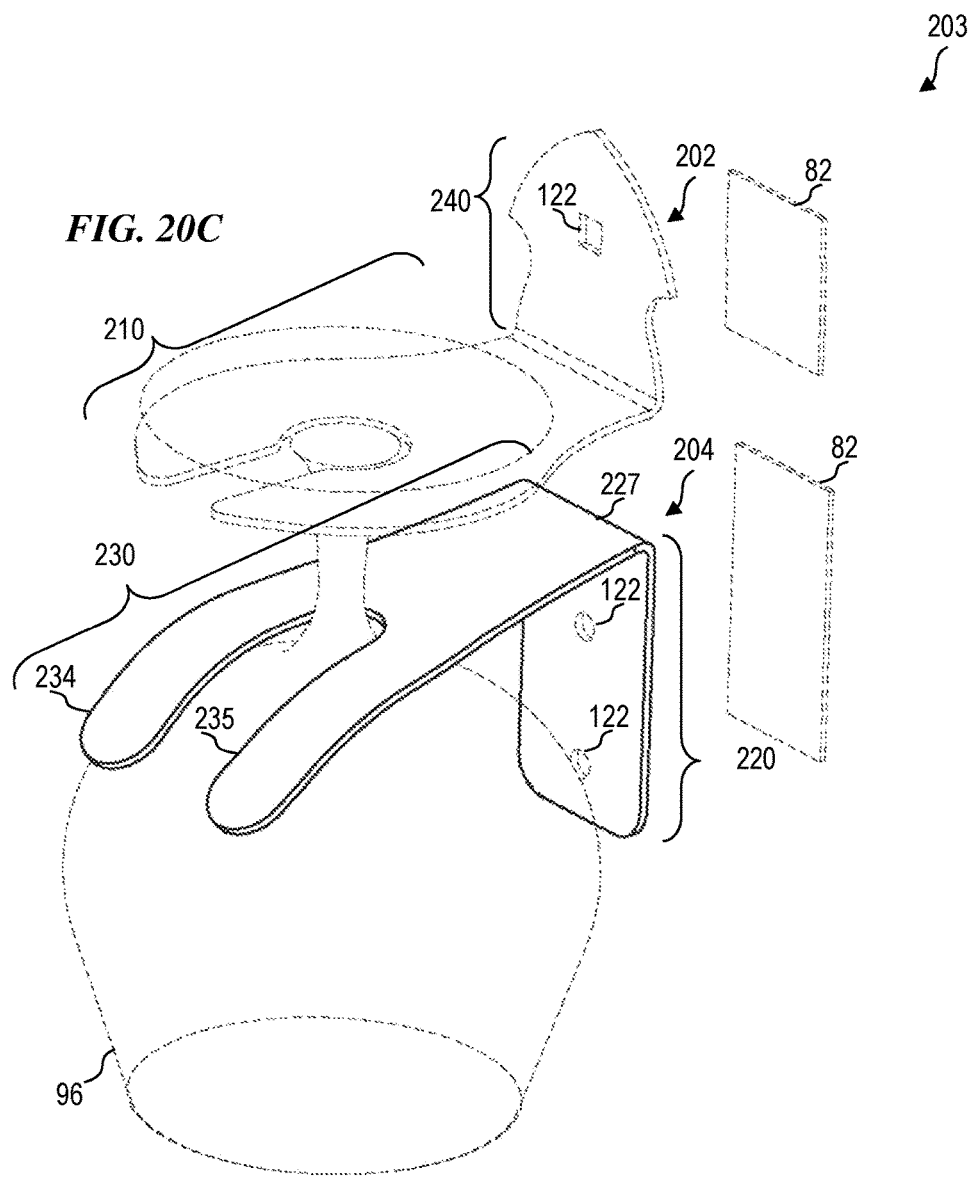

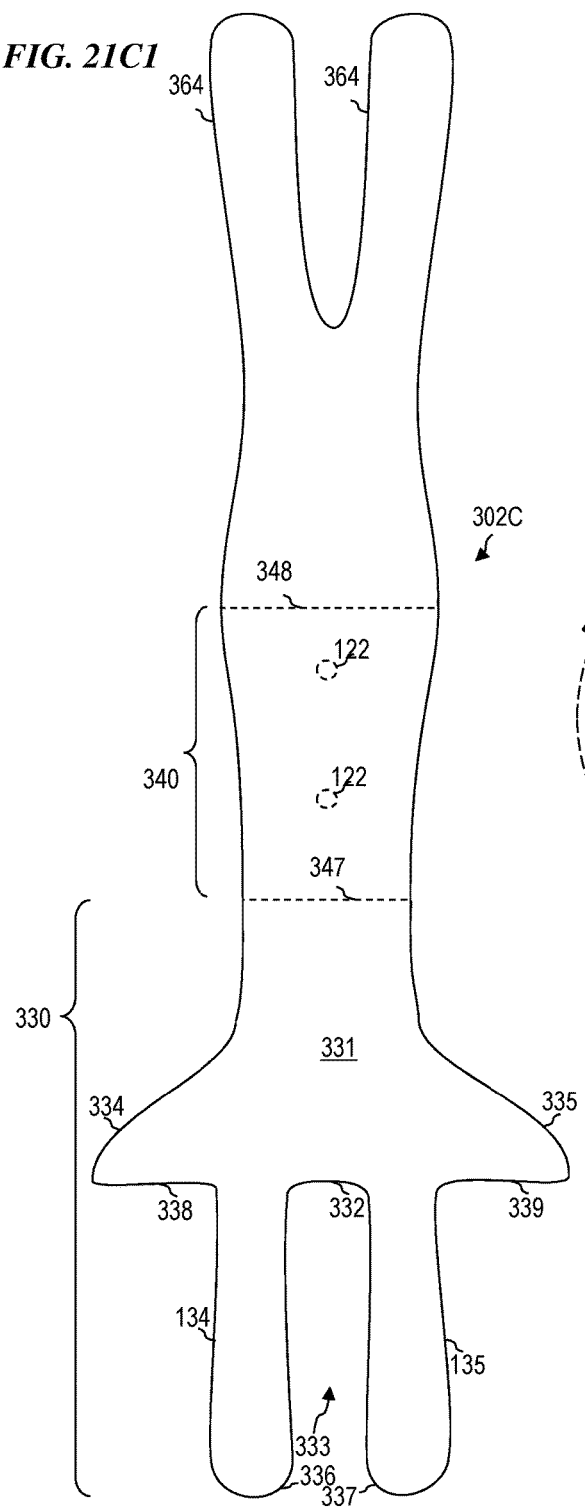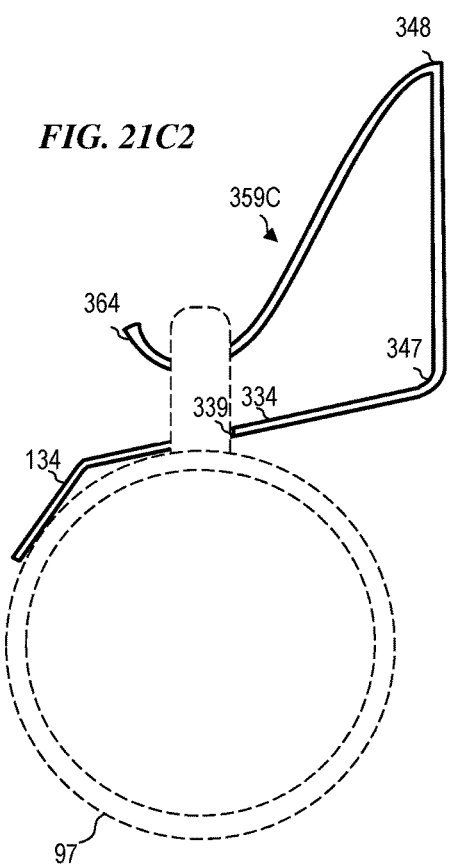
FIG. 21C1
FIG. 21C2

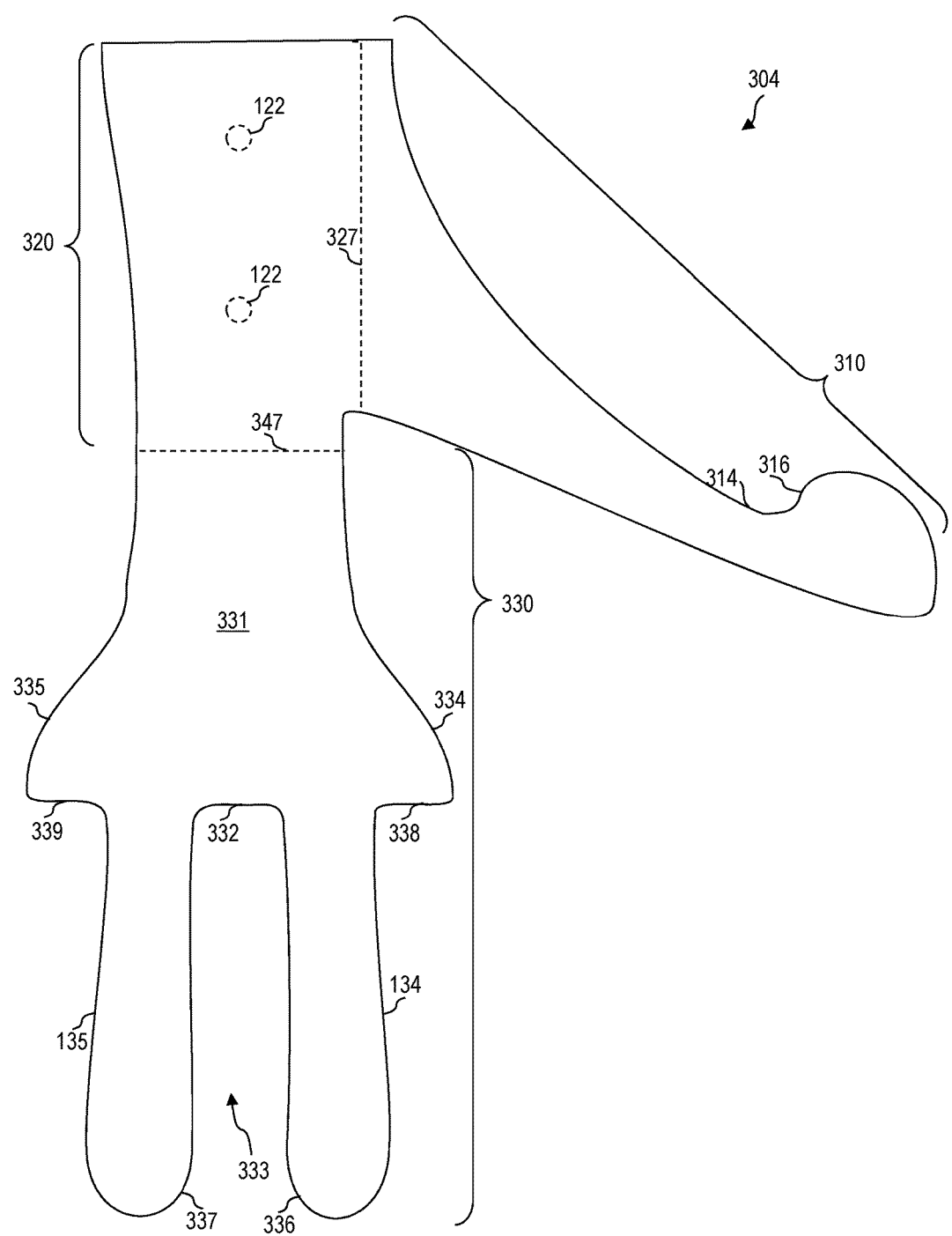
FIG. 21D1

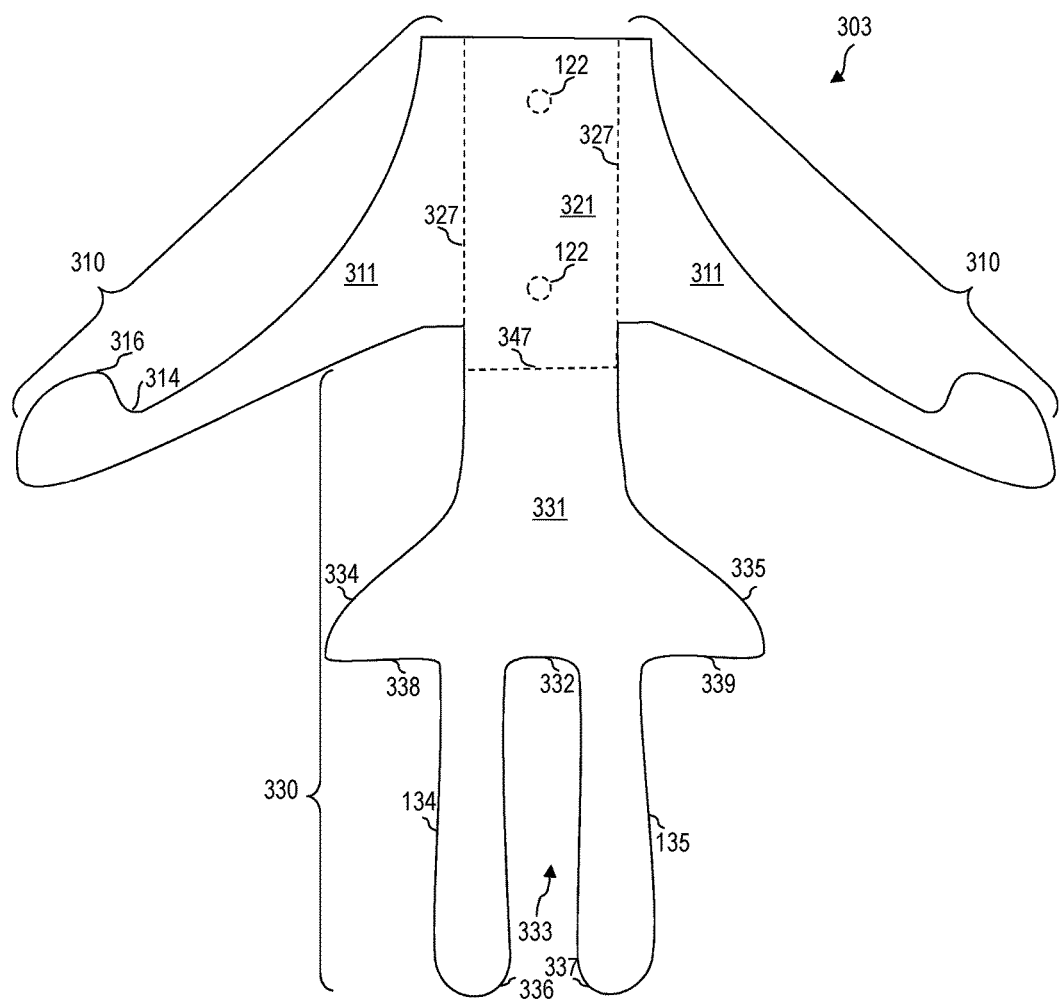
FIG. 21D2

FIG. 30
FIG. 32
FIG. 31
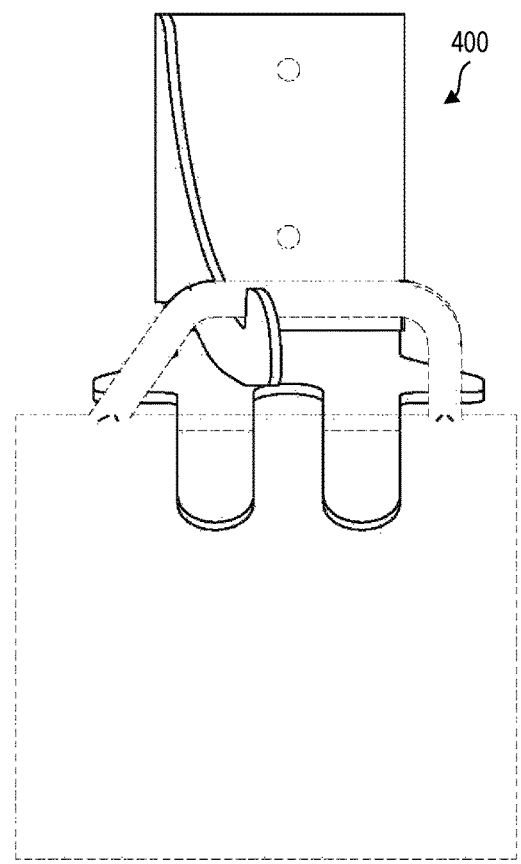
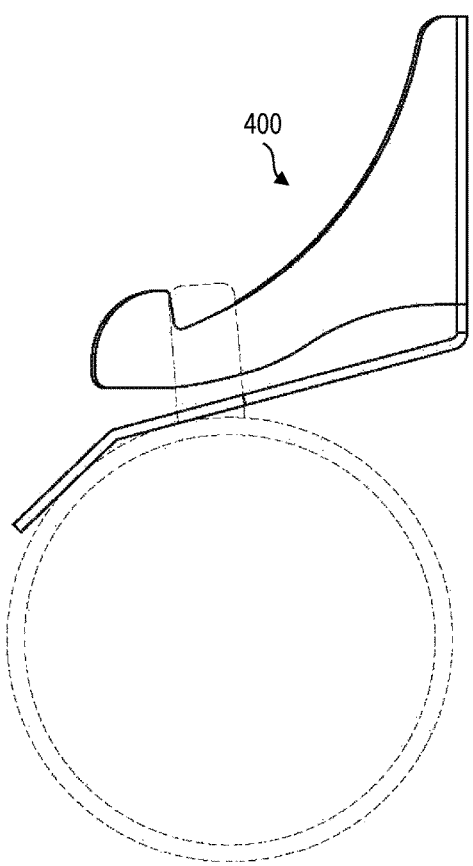
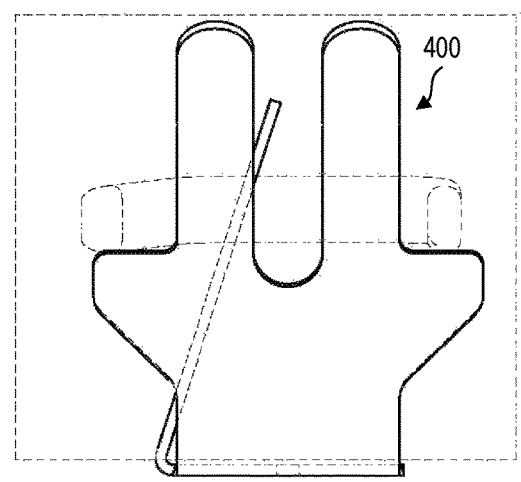

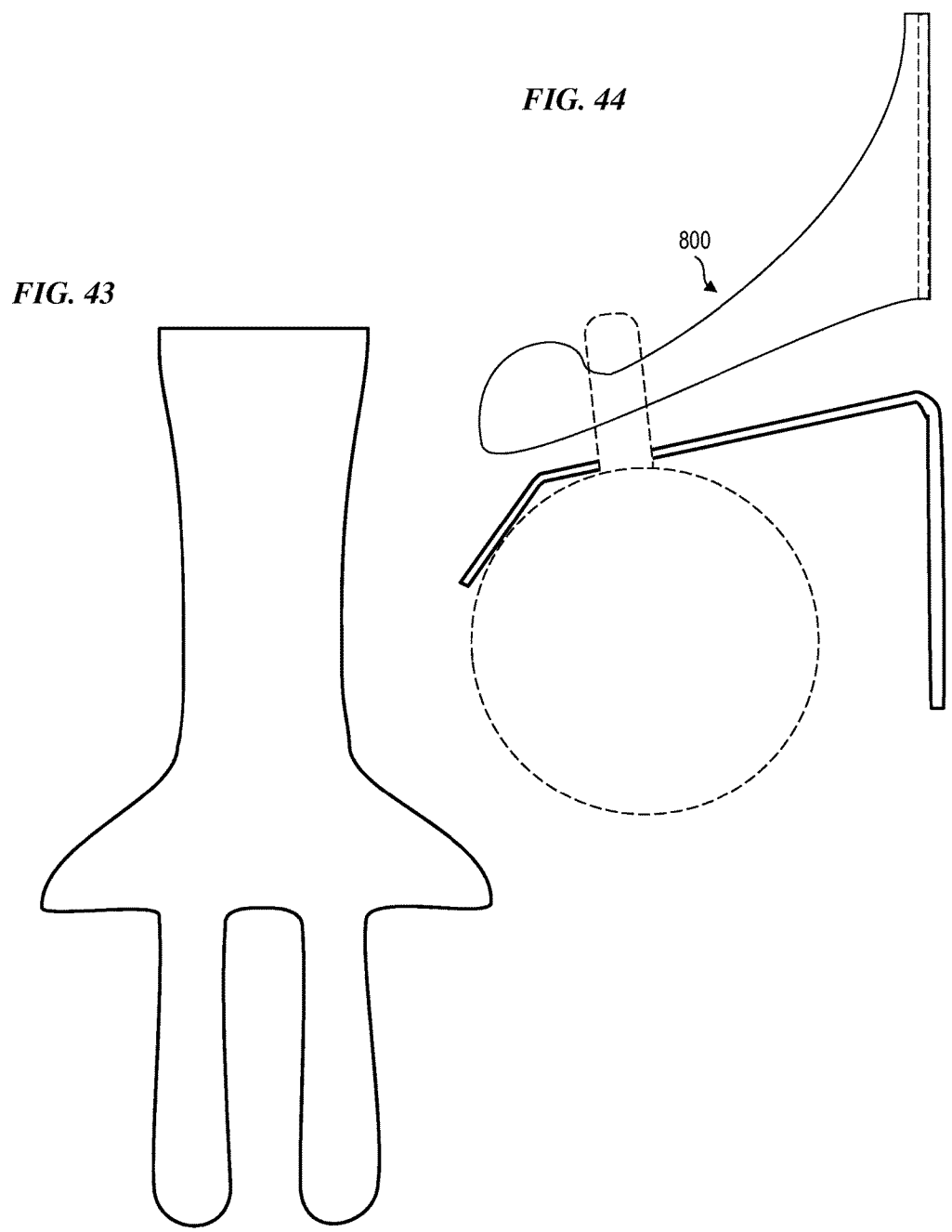

BEVERAGE-VESSEL HOLDER AND METHOD

CROSS-REFERENCE TO RELATED APPLICATION

This application is a divisional of U.S. Design patent application 29/556,395, filed Feb. 29, 2016 by LaVern N. Wobschall and titled "STEMWARE HOLDER" (which issued as U.S. Design Pa. D809,871 on Feb. 13, 2018), which is incorporated herein by reference in its entirety.

FIELD OF THE INVENTION

This invention relates to the field of fixtures for mobile dwellings, such as recreational vehicles, boats, trailers, aircraft and the like, and more particularly, to a holder for beverage vessels such as stemware and coffee cups that is useful with such mobile dwellings, or for areas with frequent earthquakes to help keep glasses from falling to the floor.

BACKGROUND OF THE INVENTION

U.S. Pat. No. 4,860,895 to Iaslovits issued Aug. 29, 1989 with the title "Stemware holder" and is incorporated herein by reference. U.S. Pat. No. 4,860,895 describes a stemware holder that includes two, thin, elongated, semi-concave fingers, integral at their aft regions, which define a dome rising from a tray surface. The top of the dome is truncated and is open. The inboard edges of the fingers define a fore entry slot, a converging throat, a circular, central section at the truncated top of the dome, and a stress relief slot section extending aft from the circular section. The stemware holder is attached to the tray surface at the aft region. In one embodiment, this attachment is a tab protruding upward from the plane of said tray surface wherein a base portion of the tab extends through a through passage in the tray between the tray surface and the side wall of the tray. Ribs are disposed at an intermediate location on the top surface of the fingers and run longitudinal between the stress relief slot section and the outboard edge of each finger.

U.S. Pat. No. 6,059,138 to Labruyere issued on May 9, 2000 with the title "Slotted cup holder," and is incorporated herein by reference. U.S. Pat. No. 6,059,138 describes a slotted cup holder having multiple slots that is adapted to accommodate a variety of beverage container shapes. The cup holder comprises a cylindrical body having two elongated lateral slots for a cup handle, a semi-circular top anterior slot, a large horizontal bottom anterior slot disposed at the front base of the cylindrical body, and an integrally formed elongated flat appendage that extends outward from the rear base of the cylindrical body. The elongated flat appendage serves to secure the cup holder to an appropriately configured table by sliding the appendage between a table rail and the table. The present invention is designed to accommodate not only traditional non-handled cups, but also handled cups, as well as short and long stem wine glasses. The economy of design of the present invention makes the slotted cup holder both practical and inexpensive.

U.S. Pat. No. 6,126,256 issued to Doces, II on Oct. 3, 2000 with the title "Portable stemmed glass/container retention rack & serving tray" and is incorporated herein by reference. U.S. Pat. No. 6,126,256 describes a storage rack for stemmed glasses and other containers having apertures with chamfered edges forming sockets for reception of the bases of inverted stemmed glasses. Access slots to the apertures are non radial with respect to the center of the apertures and are preferably tangential to the apertures. A pivotally mounted serving/mixing tray overlies the bases of the stemmed glasses to positively hold them within their sockets with positive holddowns or keeper members positioned to maintain the tray top in place. The rack may be wall mounted or adapted to be supported on a table top or the like and may be provided with carrying handles. In one embodiment, the storage rack is combined with a wine bottle rack having a cradle comprised of wedge shaped support members with contact surfaces inclined at less than 45 degrees to the vertical. The bottles are thus supported above the surface of the shelf and the weight of the bottles themselves holds them in tight engagement within the cradle. When combined with a portable sink and/or ice makers the bar unit becomes a self-contained installation for home, office, boat or RV use.

U.S. Pat. No. 7,131,545 issued to Grogan on Nov. 7, 2006 with the title "Glass rack" and is incorporated herein by reference. U.S. Pat. No. 7,131,545 describes an apparatus for a rack for stemware includes a main base plate having a device for engaging and retaining the positioning of a first and second portion of an article to be held. A pair of straps are predeterminedly fastened to the base whereby a plurality of glasses having a base can be inserted under opposing portions of the straps whereby the plurality of glasses are prevented from movement. The apparatus also provides for an additional method of fastening the straps by providing a plurality of row of throughbores whereby the straps can be woven through the holes in a number of methods with the end result being that stemware-like glasses can be retained by sliding one side of the glass base under one of the straps and the other side of the glass base under the opposing strap.

U.S. Pat. No. 8,840,078 issued to DeWald on Sep. 23, 2014 with the title "Portable beverage holder," and is incorporated herein by reference. U.S. Pat. No. 8,840,078 describes a portable beverage holder having a middle piece and a bottom piece operably coupled to each other, and wherein the middle piece includes a frontal opening sufficient for receiving the stem of a stemmed container, and wherein the bottom piece includes a frontal opening sufficient for receiving the foot of a stemmed container, and wherein the bottom side of the middle piece includes one or more downward projecting flaps sufficient to secure the foot of a stemmed container against the bottom piece. The beverage holder optionally can include a top piece operably coupled to the middle piece, also having a frontal opening sufficient for receiving the stem of a stemmed container. The beverage holder can also include a non-continuous upwardly extending wall near the perimeter of the holder for containing almost any type of beverage container.

There remains a heretofore unmet need for an improved holder for a wine glass, stemware, snifter, goblet, coffee cup or the like that gently but securely receives and holds such beverage vessels and liquid drink containers, for example, in a mobile environment where movement of the environment would otherwise dislodge the glassware, such as recreational vehicles, aircraft or boats.

SUMMARY OF THE INVENTION

In some embodiments, the present invention provides a holder that includes a first support structure that holds a first portion of a beverage vessel, and a plurality of resilient "fingers" that press against a second portion of the beverage vessel to gently urge the beverage vessel to remain in the first support structure.

In some embodiments, the beverage vessel is a glass stemware beverage vessel such as a wine glass, snifter, goblet or the like, which has a base, a globe for holding the beverage, and a stem that connects the base to the globe, wherein the first support structure includes a keyhole-shaped slot that widens at the internal terminus of the slot for receiving a first base portion of a stem of the stemware, and the plurality of fingers include two springy finger-like extensions that extend on either side of a second opposite-end portion of the stem and press against a plurality of locations on the globe portion of the stemware beverage vessel to urge the second opposite-end portion of the stem into contact with an interior end of the slot formed between the two springy finger-like extensions, and to urge the first base portion of the stem into the widened internal terminus of the keyhole-shaped slot of the first support structure. In some embodiments, the first support structure and plurality of fingers, as well as a first wall-connection plate, are formed of a single piece of resilient material such as a polycarbonate polymer or other suitable material. In other embodiments, the plurality of fingers and the first wall-connection plate are formed of a first single piece of resilient material such as a polycarbonate polymer or other suitable material, and the first support structure and a second wall-connection plate are formed of a single piece of material, which may include plate steel, a polycarbonate polymer or other suitable material. The holder's wall connection plate can be affixed to a wall of a room, the wall inside a cabinet, to a wine rack or the like. In some embodiments, the wall connection plate is attached to a vertical wall, while in other embodiments, it can be attached to a horizontal surface or an angled surface.

In some other embodiments, the beverage vessel is a coffee-cup-like beverage vessel having a handle connected to a cup portion of the vessel at both of two ends of the handle, wherein the first support structure includes a hook-shaped extension that widens at the distal end of the extension for inserting into the handle of the coffee-cup-like beverage vessel to support the weight of the coffee-cup-like beverage vessel, and wherein the plurality of fingers include two springy finger-like extensions with wing-like side extensions, wherein at least one of the two springy finger-like extensions extends through the interior opening of the handle, and wherein the two springy finger-like extensions press against a plurality of locations on the cup portion of the coffee-cup-like beverage vessel to urge the handle into contact with either an interior end of the slot formed between the two springy finger-like extensions and with one or both of the wing-like side extensions of the two springy finger-like extensions, and to urge the handle into the hook-shaped extension of the first support structure. In some embodiments, the first support structure and plurality of fingers, as well as a first wall-connection plate, are formed of a single piece of resilient material such as a polycarbonate polymer or other suitable material (for example, in some such embodiments, the first support structure includes a planar portion forming a vertical wall extending outward from a first vertical edge of the first wall-connection plate, while in other embodiments, an optional second support structure is provided that includes a planar portion forming a vertical wall extending outward from a second vertical edge of the first wall-connection plate). In other embodiments, the plurality of fingers and the first wall-connection plate are formed of a first single piece of resilient material such as a polycarbonate polymer or other suitable material, and the first support structure (and optionally the optional second support structure) and a second wall-connection plate are formed of a second single piece of material, which may include plate steel, a polycarbonate polymer or other suitable material.

In some embodiments, blanks for the present invention are cut from flat-sheet material (e.g., in some embodiments, polycarbonate), and then bent at room temperature to the desired form. In other embodiments, the blanks are heated until the material is soft and pliable and then formed to the desired shape. In still other embodiments, the final objects of the present invention are injection molded from liquid polymer. In some embodiments, clear polycarbonate or other suitable polymer is used, while in other embodiments, polymer that is tinted or solid colored to a desired color is used. In yet other embodiments, thin springy stainless steel is used. In other embodiments, other suitable materials and/or combinations of materials are used.

BRIEF DESCRIPTION OF THE DRAWINGS

In FIGS. 1-8, the relatively thin shade lines on the surface portions indicate contour and not surface decoration.

FIG. 9 is a plan view of a starting blank 102 for a holder 101 for a stemware-type beverage vessel according to some embodiments of the present invention;

FIG. 10A is a left-side view of holder 101 when the holder 101 is in the relaxed position (empty of stemware) shown in solid lines and in the compressed spring-force position (the shape it would take when holding a wine glass, for example) shown in dashed lines, according to some embodiments of the present invention;

FIG. 10B is a left-side view of holder 101 when the holder 101 is in the compressed spring-force position, according to some embodiments of the present invention;

FIG. 15 is a front view of holder 101 when the holder 101 is holding a wine glass, according to some embodiments of the present invention;

FIG. 16 is a bottom view thereof, when the holder 101 is holding a wine glass;

FIG. 17 is left-side view thereof, when the holder 101 is holding a wine glass;

FIG. 18 is a perspective view thereof, when the holder 101 is holding a wine glass;

FIG. 19 is a plan view of a set 205 of two starting blanks 201, 202 for a holder 200 for a stemware-type beverage vessel according to some embodiments of the present invention;

FIG. 20A is a left-side view of holder 200 when the holder 200 is in the relaxed position (empty of stemware) shown in solid lines and in the compressed spring-force position (the shape it would take when holding a wine glass, for example) shown in dashed lines, according to some embodiments of the present invention;

FIG. 20B is a left-side view of holder 200 when the holder 200 is in the compressed spring-force position, according to some embodiments of the present invention;

FIG. 20C is a perspective view of a holder 203 when the holder 203 is in the compressed spring-force position holding a glass snifter vessel 96, according to some embodiments of the present invention;

FIG. 21C1 is a plan view of two-hook two-finger mug support blank 302C useful for making one-part holder 359C of FIG. 21C2, according to some embodiments of the present invention;

FIG. 21C2 is a side view of two-hook two-finger mug holder 359C made from two-hook two-finger mug support blank 302C of FIG. 21C1, according to some embodiments of the present invention;

FIG. 21D1 is a plan view of one-arm two-finger mug support blank 304 useful for making one-part holder 354 of FIG. 21G, according to some embodiments of the present invention;

FIG. 21D2 is a plan view of two-arm two-finger mug support blank 303 useful for making one-part holder 356 of FIG. 21I, according to some embodiments of the present invention;

FIG. 30 is a front view of a decorative bent one-arm two-finger one-part holder 400 for a coffee-mug-type beverage vessel according to some embodiments of the present invention;

FIG. 31 is a bottom view of decorative bent one-part holder 400 according to some embodiments of the present invention;

FIG. 32 is a left-side view of decorative bent one-part holder 400 according to some embodiments of the present invention;

FIG. 43 is a plan view of a blank for a two-part holder 800 (see FIG. 44) according to some embodiments of the present invention;

FIG. 44 is a left-side view of a decorative bent two-part holder 800 according to some embodiments of the present invention.

DESCRIPTION OF PREFERRED EMBODIMENTS

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
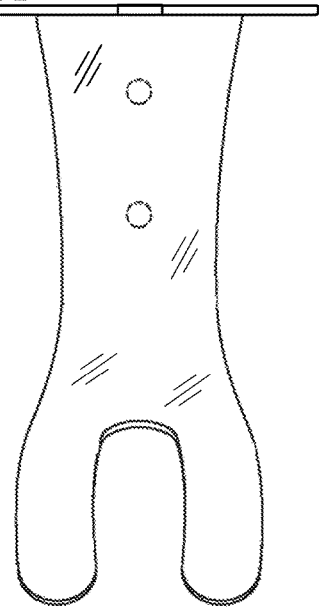
FIG. 1 is a front view of the decorative curved STEMWARE HOLDER showing the new design, when the curved STEMWARE HOLDER is empty.

FIG. 1 is a front view of the decorative curved STEMWARE HOLDER showing the new design, when the curved STEMWARE HOLDER is empty.

Figure 2:
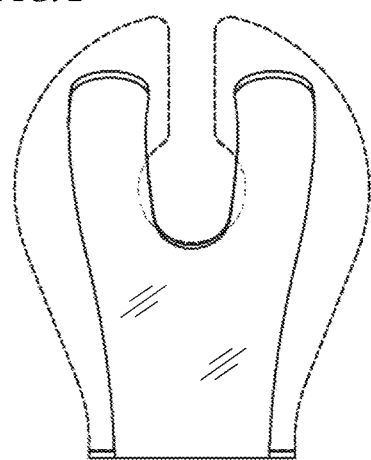
FIG. 2 is a bottom view thereof, when the curved STEMWARE HOLDER is empty.

FIG. 2 is a bottom view thereof, when the curved STEMWARE HOLDER is empty.

Figure 3:
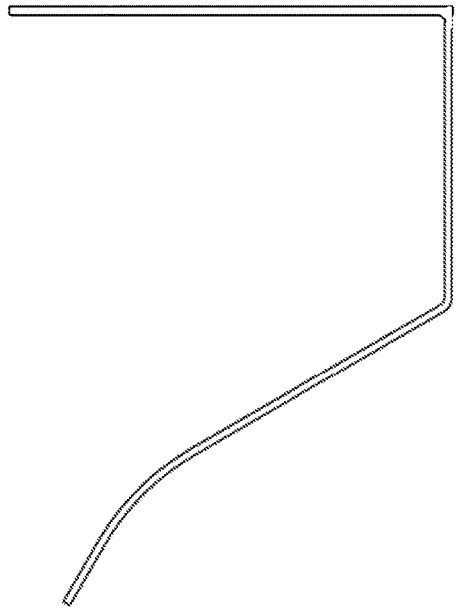
FIG. 3 is a left-side view thereof, when the curved STEMWARE HOLDER is empty.

FIG. 3 is a left-side view thereof, when the curved STEMWARE HOLDER is empty.

Figure 4:
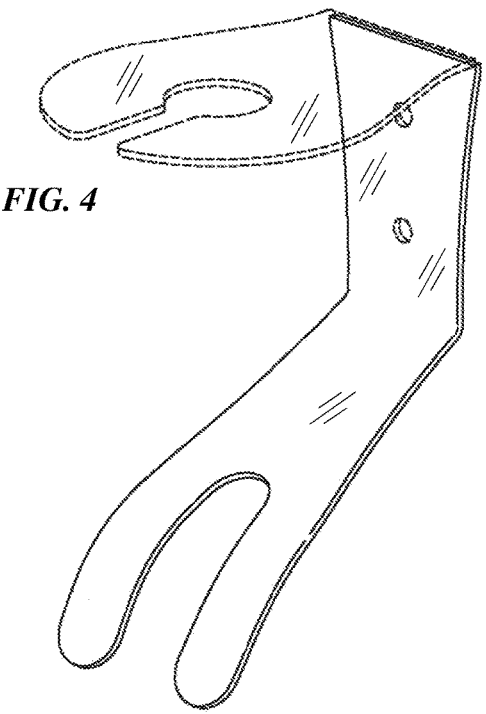
FIG. 4 is a perspective view thereof, when the curved STEMWARE HOLDER is empty.

FIG. 4 is a perspective view thereof, when the curved STEMWARE HOLDER is empty.

Figure 5:
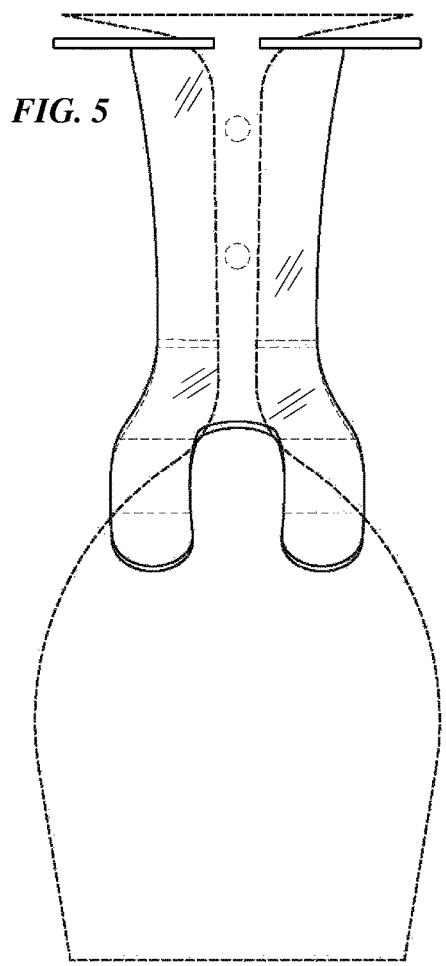
FIG. 5 is a front view of the decorative curved STEMWARE HOLDER showing the new design, when the curved STEMWARE HOLDER is holding a wine glass.

FIG. 5 is a front view of the decorative curved STEMWARE HOLDER showing the new design, when the curved STEMWARE HOLDER is holding a wine glass.

Figure 6:
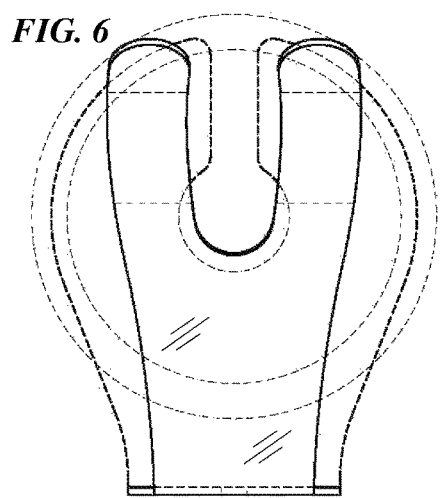
FIG. 6 is a bottom view thereof, when the curved STEMWARE HOLDER is holding a wine glass.

FIG. 6 is a bottom view thereof, when the curved STEMWARE HOLDER is holding a wine glass.

Figure 7:
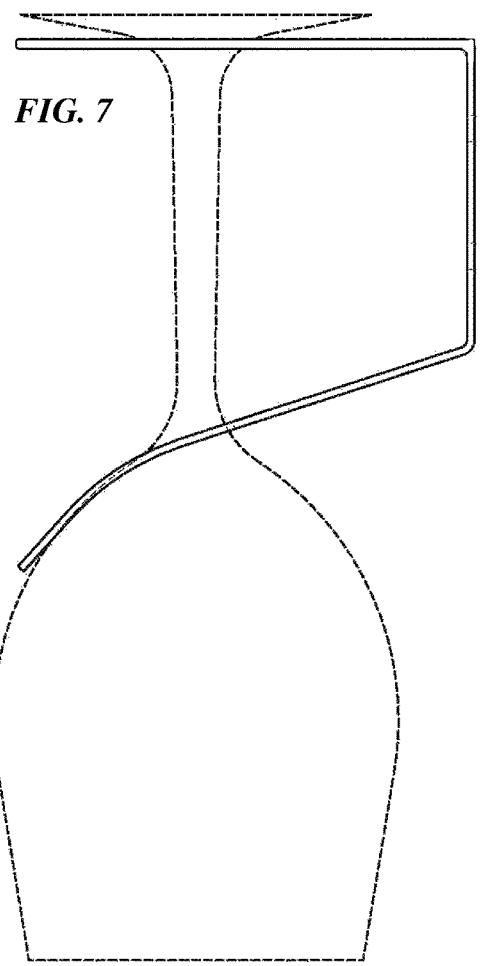
FIG. 7 is left-side view thereof, when the curved STEMWARE HOLDER is holding a wine glass.

FIG. 7 is left-side view thereof, when the curved STEMWARE HOLDER is holding a wine glass.

Figure 8:
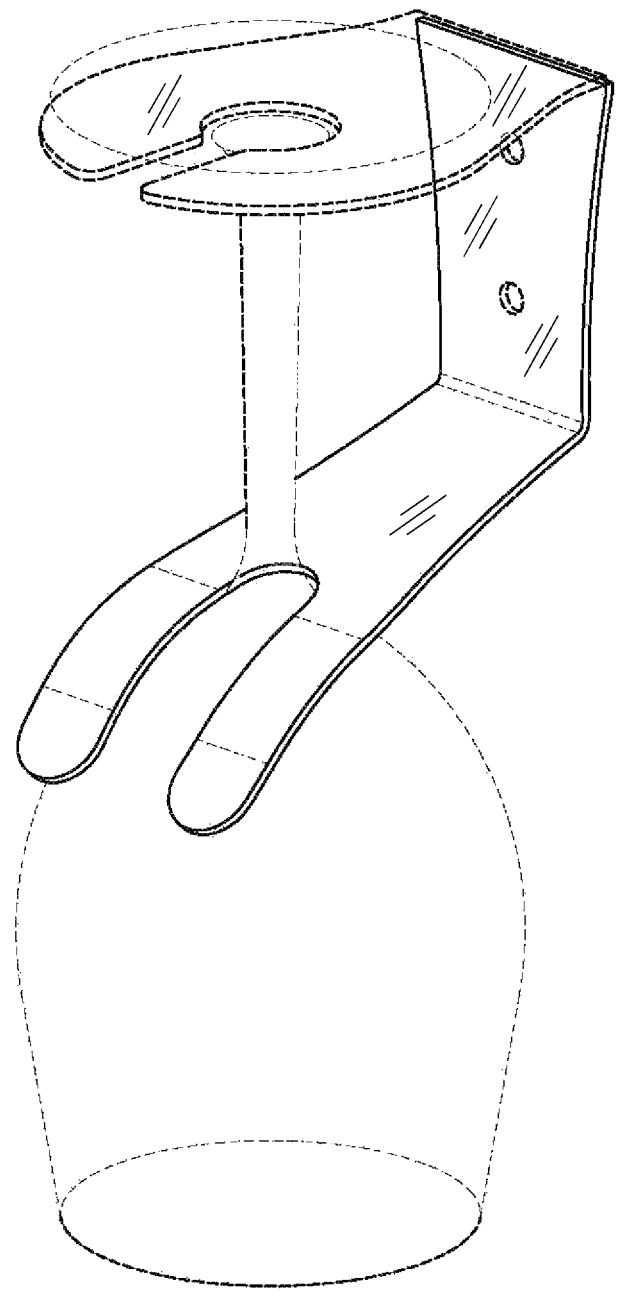
FIG. 8 is a perspective view thereof, when the curved STEMWARE HOLDER is holding a wine glass.

FIG. 8 is a perspective view thereof, when the curved STEMWARE HOLDER is holding a wine glass.

FIG. 9 is a plan view of a starting blank 102 for a holder 101 for a stemware-type beverage vessel 91 (see FIG. 15) according to some embodiments of the present invention. Beverage vessel 91 is typically used to hold liquids such as wine or brandy. In some embodiments, the upper section is bent at a 90-degree angle (in other embodiments, at a slightly less than 90 degree angle in order that it has a slight upward slant when unloaded such as shown in solid lines in FIG. 10A) to form first support structure 110, the middle section forms a first wall-connection plate 120 (some embodiments include one or more screw holes 122 for accommodating screws to affix holder 101 to a wall of the mobile dwelling), and the lower section is bent.

FIG. 10A is a left-side view of holder 101 when the holder 101 is in the relaxed state (empty of stemware) shown in solid lines at positions 118 and 138, and in the compressed spring-force position (the shape it would take when holding a wine glass, for example) shown in dashed lines at positions 119 and 139, according to some embodiments of the present invention. In some embodiments, in the relaxed state, the first support structure 110 is angled slightly upward from horizontal (to position 118) as it extends away from the wall to which holder 101 is affixed by wall-connection plate 120, but in the loaded state, the first support structure 110 is horizontal or angled slightly less upward from horizontal (to position 119). Similarly, in the relaxed state, the lower portion 130 including the plurality of fingers 134-135 is angled more downward from horizontal (to position 138) as it extends away from the wall to which holder 101 is affixed, but in the loaded state, the lower portion 130 is angled slightly less downward from horizontal (to position 139). In some such embodiments, holder 101 is made of a single piece of polycarbonate (such as 0.060-inch-thick (about 1/16 inch or about 1.5-mm thick) or such as 0.030-inch-thick (about 1/32 inch or about 0.76-mm thick) Lexan®) or other suitable polymer or the like. In other embodiments, thin springy stainless steel, or flat painted hammered steel, or brass or bronze or other suitable metal is used for one or more parts of holder 101.

FIG. 10B is a left-side view of holder 101 when the holder 101 is in the compressed spring-force position, according to some embodiments of the present invention. In the relaxed state (the solid-line position shown in FIG. 10A) the torques 128 and 129 are zero or essentially negligible from the force of gravity on support 110 or lower portion 130. In the loaded state, an increased torque 148 and/or 149 results from the bending of the joints (fold structure) between first support structure 110 and/or lower portion 130 and the wall-connection plate 120. Thus, in the loaded state, a gentle downward and inward (toward the lower left in FIG. 10B) torque 149 is applied by the displacement of the outer end of lower portion 130 due to its displacement to position 139 from position 138, and this gentle downward and inward torque 149 is transferred to the globe 92 of a wine glass 91 (see FIG. 15) to hold the stem 83 of the wine glass against the end location 132 of lower-portion slot 133 (see FIG. 14), as well as holding the flared-out base end 94 of stem 93 in the widened end 112 of keyhole slot 113 in the first support structure 110. In some embodiments, either the first support structure 110 or the lower portion 130 is springy and resilient (e.g., made of thin sheet polycarbonate), while the other of these two parts is stiffer and less resilient (e.g., made of steel). In one preferred embodiment, the entire holder 101 is made from a single piece of 0.060-inch-thick (about 1.5-mm thick) or 0.030-inch-thick (about 0.75-mm thick) polycarbonate such as Lexan®.

Figure 10C:
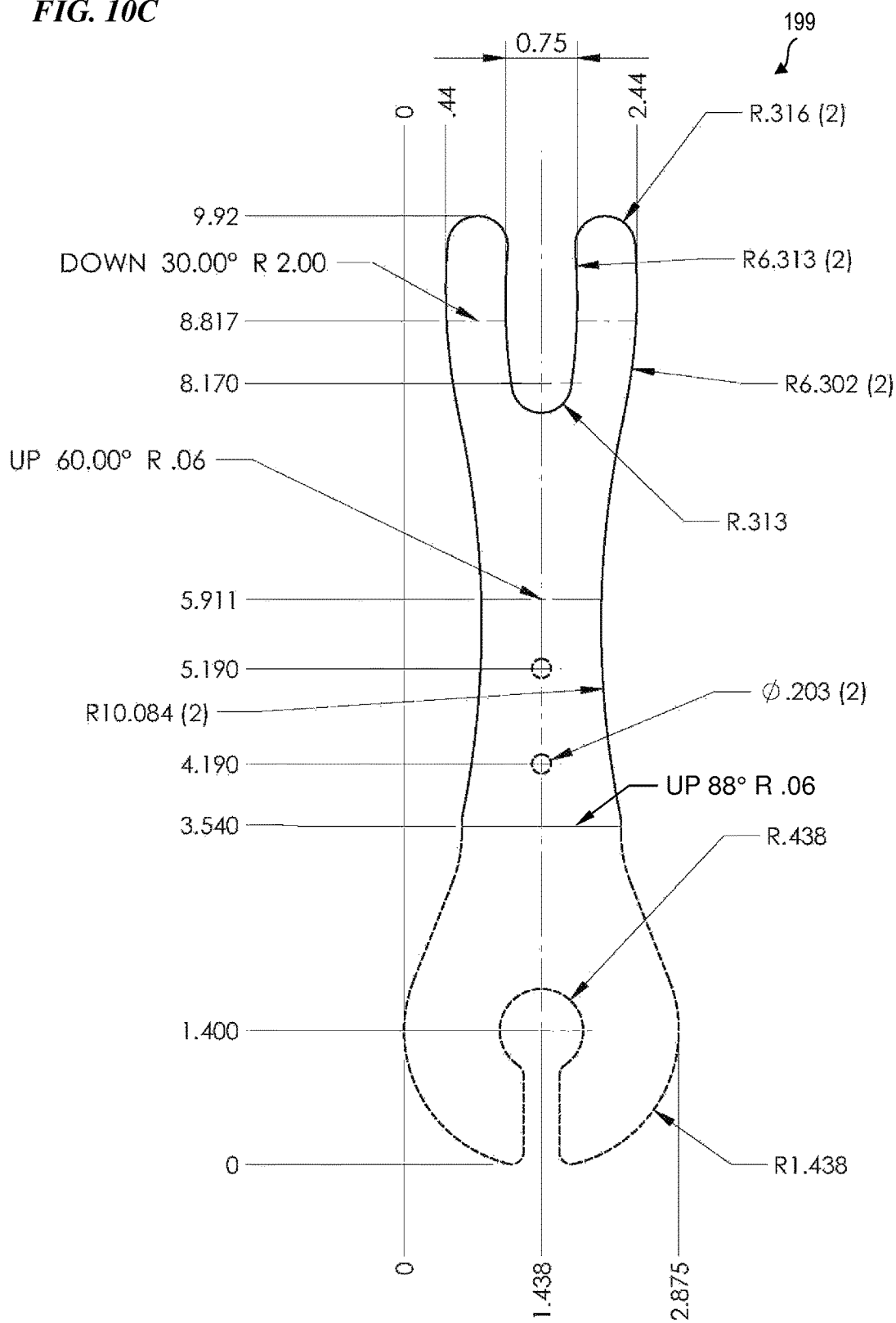
FIG. 10C is a plan view of a blank 199 for holder 101 including dimensions for one particular implementation, according to some embodiments of the present invention.

FIG. 10C is a plan view of a blank 199 for holder 101 including dimensions (in inches) for one particular implementation, according to some embodiments of the present invention.

Figure 11:
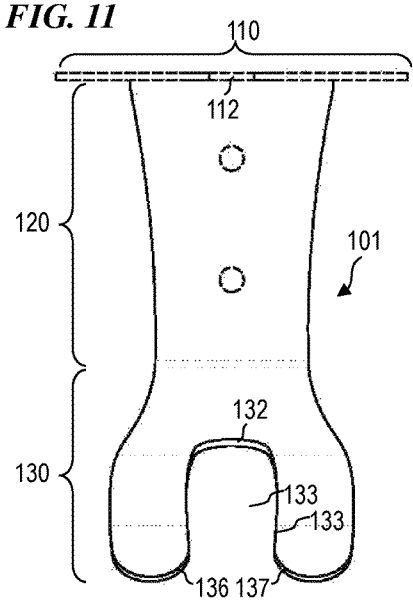
FIG. 11 is a front view of a stemware-type beverage vessel holder 101 for a stemware-type beverage vessel according to some embodiments of the present invention.

FIG. 11 is a front view of a holder 101 for a stemware-type beverage vessel according to some embodiments of the present invention. In some embodiments, holder 101 includes a first support structure 110, a wall-connection plate 120 and a lower portion 130. In some embodiments, lower portion 130 includes a pair of fingers 134-135 and a slot 133 separating the fingers 134 and 135. In some embodiments, when a stemmed beverage vessel 91 is inserted (e.g., by inserting the globe-end 98 of stem 93 in slot 133 and urging the lower portion 130 of holder 101 upward until the base end 94 of stem 93 is inserted into keyhole-shaped slot 112, whereupon the stemmed beverage vessel 91 can be released) a plurality of contact points 136-137 press inward and downward against the globe 92 of the stemmed beverage vessel 91, the globe-end 96 of stem 93 in slot 133 presses against end point 132 of slot 133, and the flared base end 94 of stem 93 is held downward in widened end 112 of keyhole slot 113 of first support structure 110. Due to the bending forces, the upper unloaded zero-torque 128 increases to a gentle loaded torque 148 (see FIG. 10B), and the lower unloaded zero-torque 129 increases to a gentle loaded torque 149 (see FIG. 10B), thus holding the stemmed beverage vessel 91 (e.g., a wine glass) in place.

Figure 12:
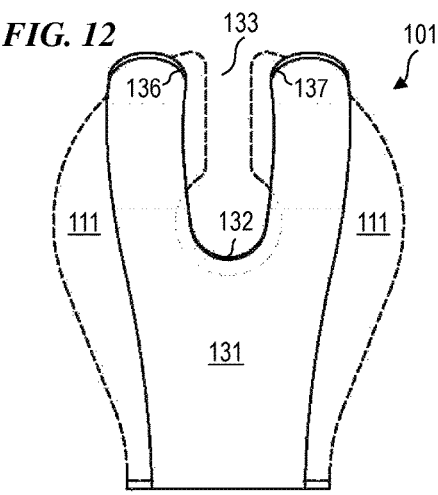
FIG. 12 is a bottom view of holder 101 when the holder is empty according to some embodiments of the present invention.

FIG. 12 is a bottom view of holder 101 when the goblet holder is empty according to some embodiments of the present invention. In this view, one can see the surface 111 of the first support structure 110 (which is shown in dashed lines here solely to indicate that this support structure is optionally a separate part in some embodiments).

Figure 13:
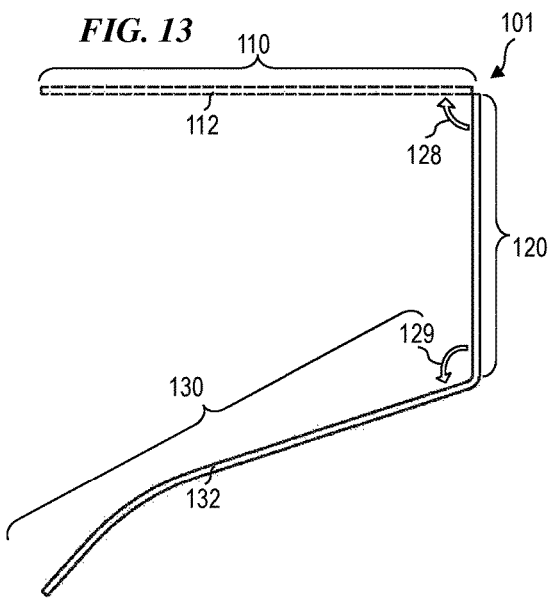
FIG. 13 is a left-side view of holder 101 when the holder is empty according to some embodiments of the present invention.

FIG. 13 is a left-side view of holder 101 when the goblet holder is empty according to some embodiments of the present invention. Further details are provided in the discussion of FIG. 10A, FIG. 10B, FIG. 11 and FIG. 14.

Figure 14:
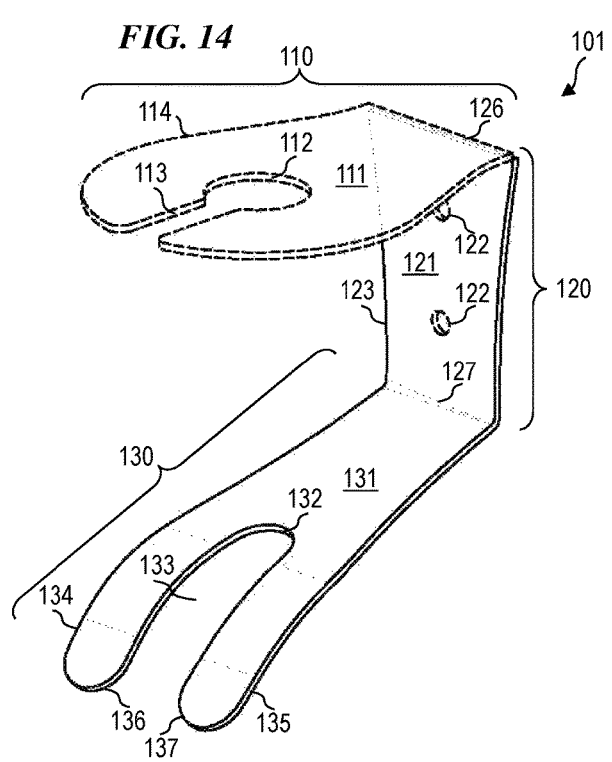
FIG. 14 is a perspective view of holder 101 when the holder is empty according to some embodiments of the present invention.

FIG. 14 is a perspective view of holder 101 when the goblet holder is empty according to some embodiments of the present invention. Further details are provided in the discussion of FIG. 10A, FIG. 10B, and FIG. 11. In some embodiments, holder 101 includes a first support structure 110 (which is shown in dashed lines here solely to indicate that this first support structure 110 is optionally a separate part in some embodiments), a wall-connection plate 120 and a lower portion 130. In some embodiments, lower portion 130 includes a pair of fingers 134 and 135 and a slot 133 separating the fingers 134 and 135 and ending in contact point 132 that presses against the globe end 96 of stem 93 of stemmed beverage vessel 91 (see FIGS. 15-18). In some embodiments, a plurality of contact points 136-137 press against the globe 92 of stemmed beverage vessel to urge the base end 94 of stem 93 into the widened end 112 of keyhole slot 113. In this view, one can see the major-face surface 111 of first support structure 110, the major-face surface 121 of wall-connection plate 120, and the major-face surface 131 of lower portion 130. In some embodiments, one or more screw holes 122 are formed in wall-connection plate 120. In some embodiments, double-sided adhesive foam can be used instead of or in addition to screws to affix holder 101 to a wall of the mobile dwelling. In some such embodiments, the double-sided adhesive foam provides a slight additional vibration resistance to the present invention. In some embodiments, the outer edge 114 of first support structure 110 is made curved and slightly larger in diameter than the diameter of the base 95 (see FIG. 15) of stemmed beverage vessel 91 in order to protect the edge of the base 95 from being chipped by accidental contact with other glasses or dishes. In some embodiments, (not shown here) the edges 123 of wall-connection plate are folded or bent outward to provide additional stiffness if needed to prevent cracking that could otherwise occur down the vertical centerline next to the screw holes 122.

FIG. 15 is a front view of holder 101 when the holder 101 is holding a stemmed beverage vessel 91 (e.g., wine glass), according to some embodiments of the present invention. In some embodiments, wine glass 91 includes a globe 92, stem 93 that has a globe-end 94, and has a flared base end 94 that connects to base 95. Further details are provided in the discussion of FIG. 10A, FIG. 10B, FIG. 11, FIG. 12, FIG. 13 and FIG. 14.

FIG. 16 is a bottom view holder 101, when holder 101 is holding a wine glass.

FIG. 17 is left-side view holder 101, when holder 101 is holding a wine glass.

FIG. 18 is a perspective view holder 101, when holder 101 is holding a wine glass. In some embodiments, a double-sided adhesive foam piece 82 is provided instead of or in addition to the screws for both securing holder 101 to a wall and for reducing vibration.

FIG. 19 is a plan view of two starting blanks 202 for a holder 200 for a stemware-type beverage vessel according to some embodiments of the present invention. In some embodiments, the present invention includes only the lower section 201. In other embodiments, both the lower section 201 and the upper section 202 are provided. In some embodiments, lower section 201 includes a lower portion 230 (substantially similar to lower portion 130 of holder 101) and a wall-connection plate 220 (substantially similar to wall-connection plate 120 of holder 101) having one or more screw holes 222. Other aspects of holder 201 are as described for holder 101. In some embodiments, upper section 202 includes a support structure 210 (substantially similar to support structure 110 of holder 101) and a wall-connection plate 240 (similar in function to wall-connection plate 120 of holder 101) having one or more screw holes 222. Other aspects of holder 201 are as described for holder 101.

FIG. 20A is a left-side view of holder 200 according to some embodiments of the present invention, when the holder 200 is in the relaxed state (empty of stemware) shown in solid lines at positions 218 and 238, and in the compressed spring-force position (the shape it would take when holding a wine glass, for example) shown in dashed lines at positions 219 and 239, according to some embodiments of the present invention. In some embodiments, in the relaxed state, the first support structure 210 is horizontal (at position 218, or angled slightly upward from horizontal—not shown) as it extends away from the wall to which holder 201 is affixed by wall-connection plate 240, but in the loaded state, the first support structure 210 is horizontal (at position 219 which is about position 218) or angled slightly less upward from horizontal (not shown). Similarly, in the relaxed state, the lower portion 230 including the plurality of fingers 234-235 is angled more downward from horizontal (to position 238) as it extends away from the wall to which holder 201 is affixed, but in the loaded state, the lower portion 230 is angled slightly less downward from horizontal (to position 239). In some such embodiments, holder 201 is made of two pieces of polycarbonate (such as 0.060-inch-thick (about 1/16 inch or about 1.5-mm thick) or such as 0.030-inch-thick (about ⅟32 inch or about 0.76-mm thick) Lexan®) or other suitable polymer or the like. In other embodiments, thin springy stainless steel, or flat painted hammered steel is used for one or the other portions 202 or 201.

FIG. 20B is a left-side view of holder 201 when the holder 201 is in the compressed spring-force position, according to some embodiments of the present invention. See the description for FIG. 20A for more details.

FIG. 20C is a perspective view of a holder 203 when the holder 203 is in the compressed spring-force position holding a glass snifter vessel 96, according to some embodiments of the present invention. In some embodiments, the present invention includes only the tension-providing lower section 204. In other embodiments, both the lower section 204 and the upper section 202 are provided. In some embodiments, lower section 204 includes a spring-finger portion 230 (substantially similar to lower portion 130 of holder 101) having a plurality of fingers 234-235 and a wall-connection plate 220 (substantially similar to wall-connection plate 120 of holder 101) having one or more screw holes 222. In some embodiments, spring-finger portion 230 wall-connection plate 220 are made of a single piece of polycarbonate that is bent at fold line 227. In some embodiments, fingers 234 and 235 are curved as shown here, while in other embodiments, they are bent such as shown in FIG. 21G described below. Other aspects of holder 203 are as described for holder 101. In some embodiments, upper section 202 includes a support structure 210 (substantially similar to support structure 110 of holder 101) and a wall-connection plate 240 (similar in function to wall-connection plate 120 of holder 101) having one or more screw holes 122. Other aspects of holder 203 are as described for holder 101.

Figure 21A:
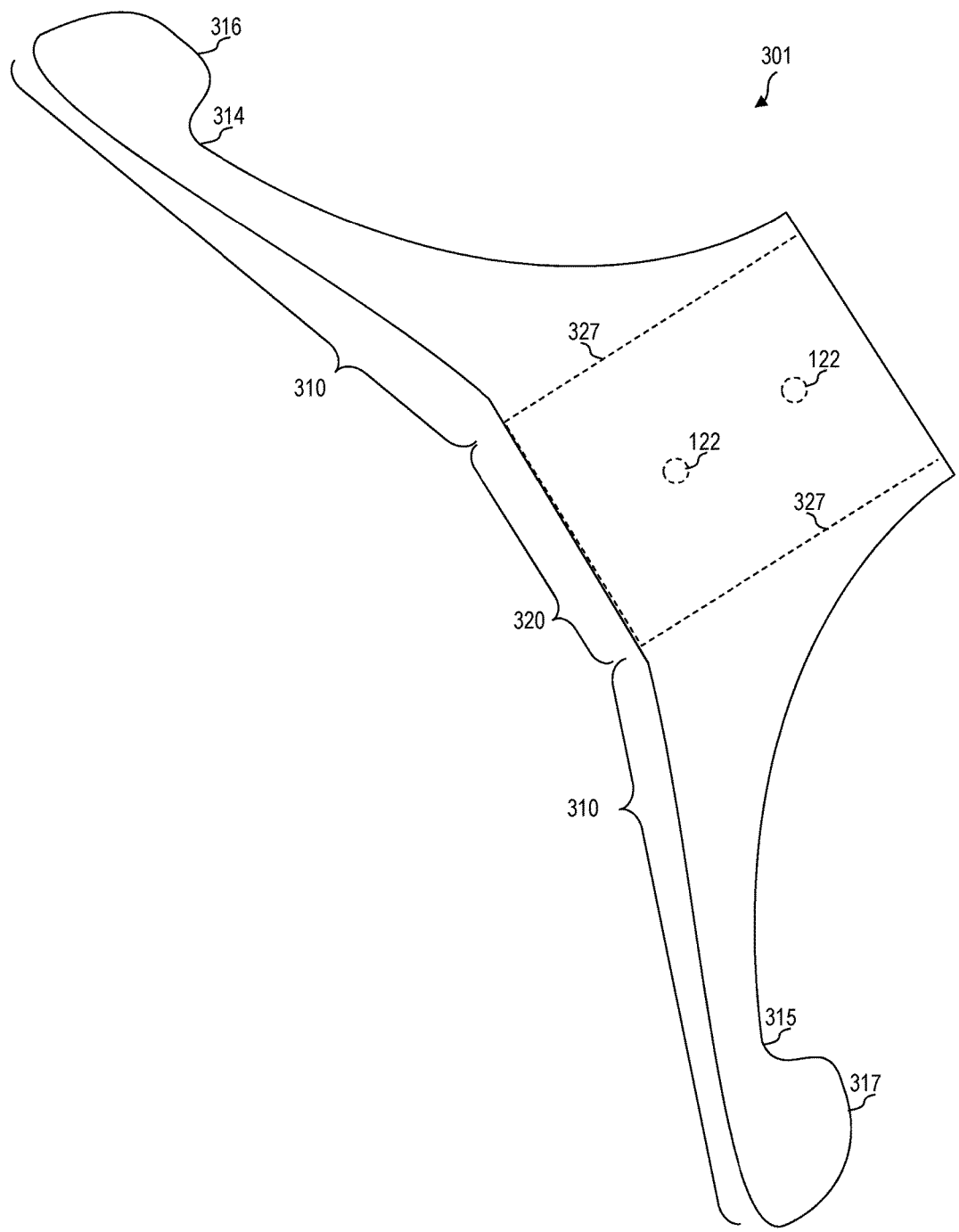
FIG. 21A is a plan view of two-hook mug support blank 301 useful for making part 357 of two-part holder 359 of FIG. 21J, according to some embodiments of the present invention.
Figure 21B:
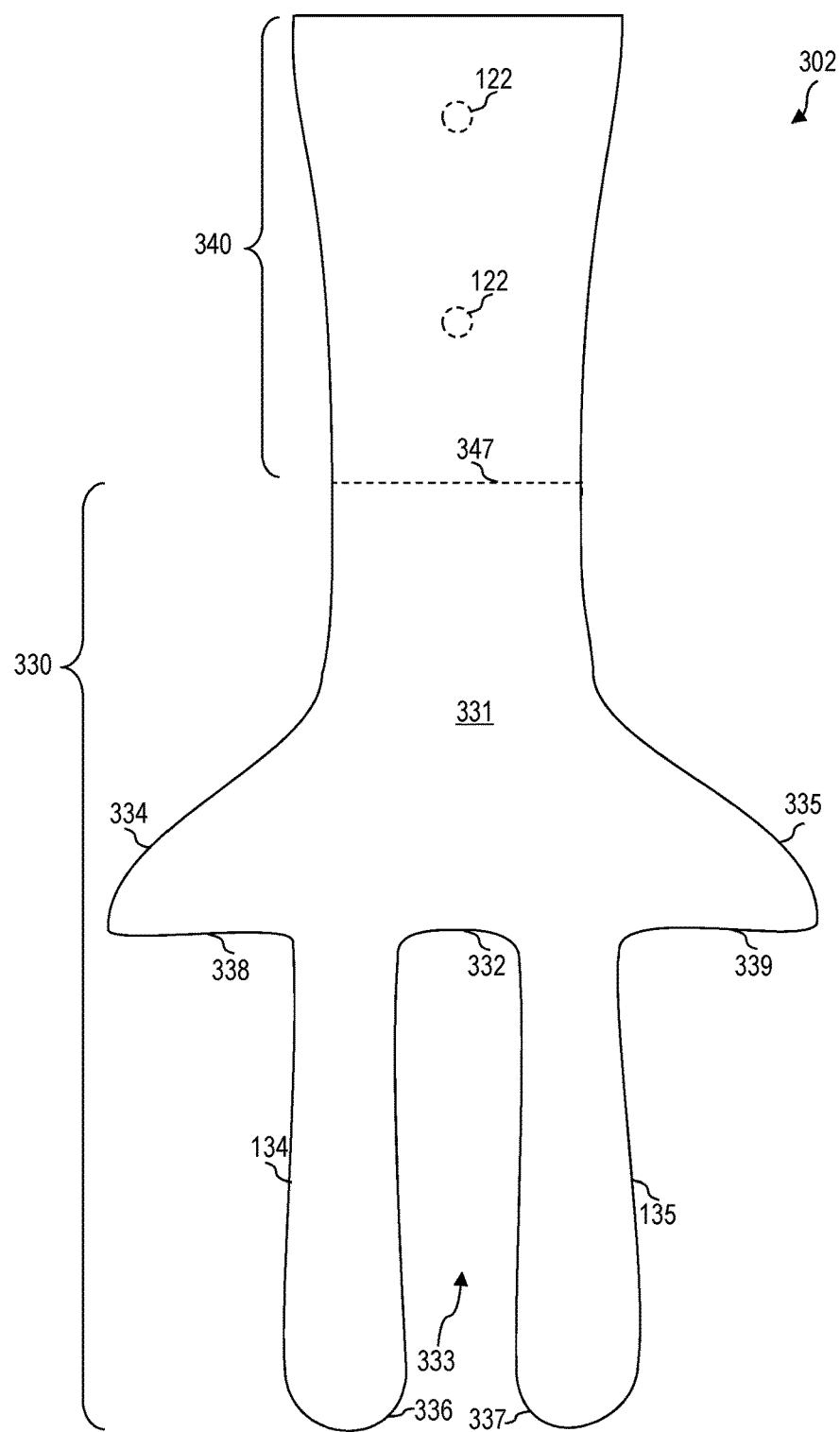
FIG. 21B is a plan view of two-finger mug tension blank 302 useful for making part 358 of two-part holder 359 of FIG. 21J, according to some embodiments of the present invention.
Figure 21E:
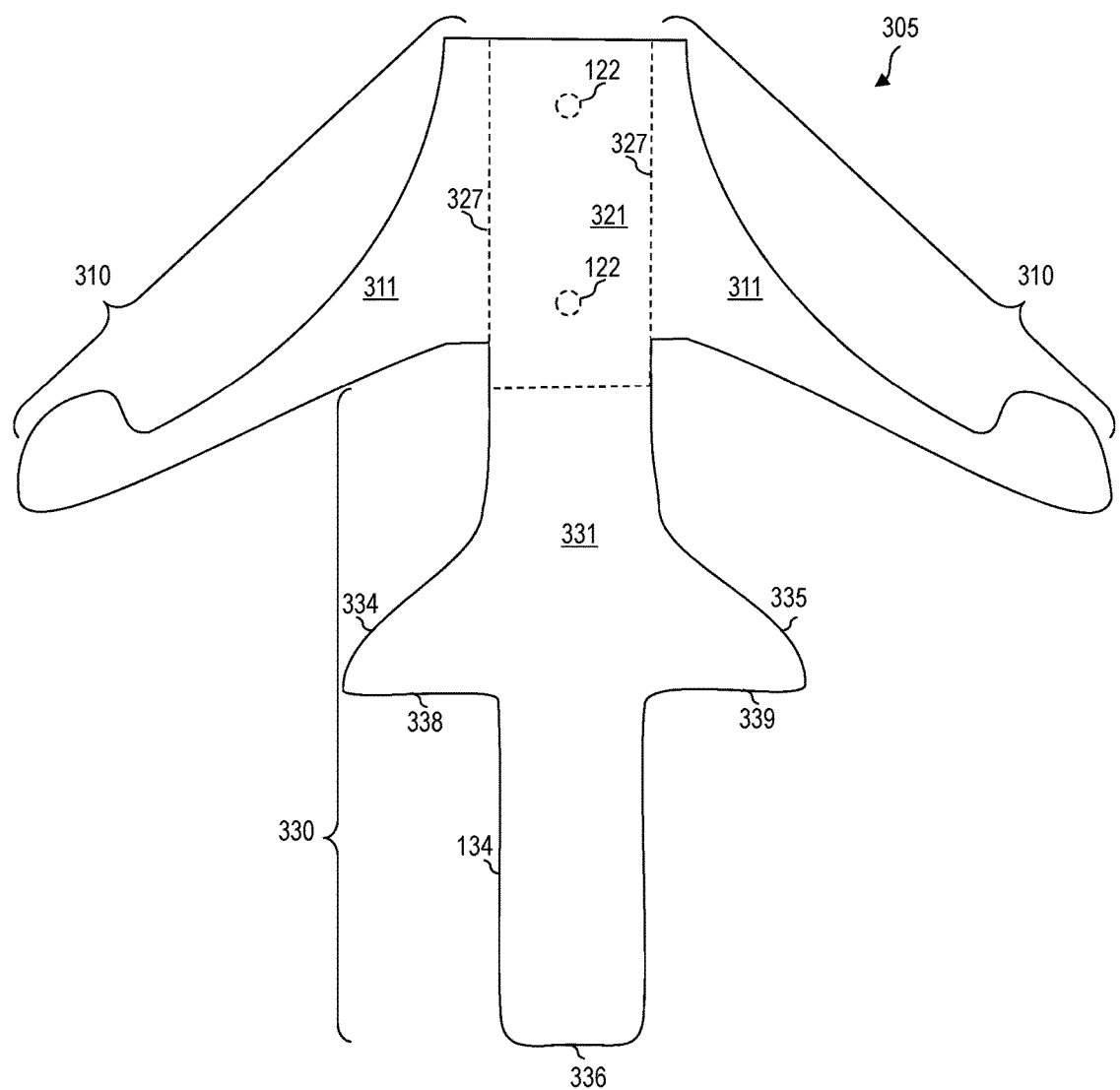
FIG. 21E is a plan view of two-arm one-finger mug support blank 305 useful for making one-part holder 359 of FIG. 21I, according to some embodiments of the present invention.
Figure 21F:
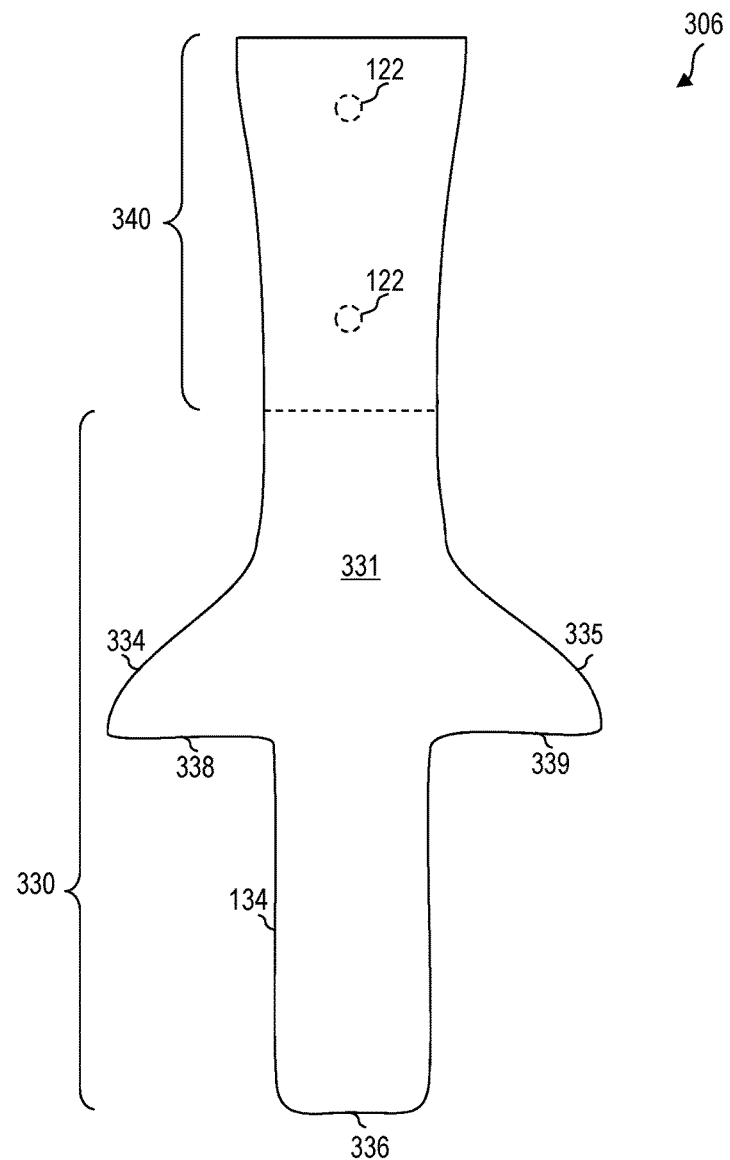
FIG. 21F is a plan view of one-finger mug tension blank 306 useful for making two-part holder similar to 359 of FIG. 21J (but with a single spring finger), according to some embodiments of the present invention.
Figure 21G:
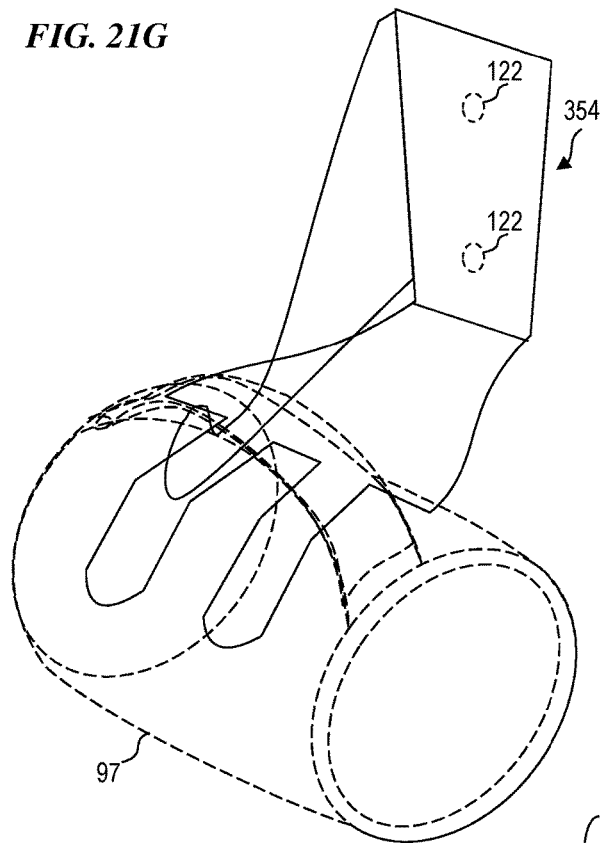
FIG. 21G is a perspective view of one-arm two-finger one-part mug holder 354, according to some embodiments of the present invention.
Figure 21H:
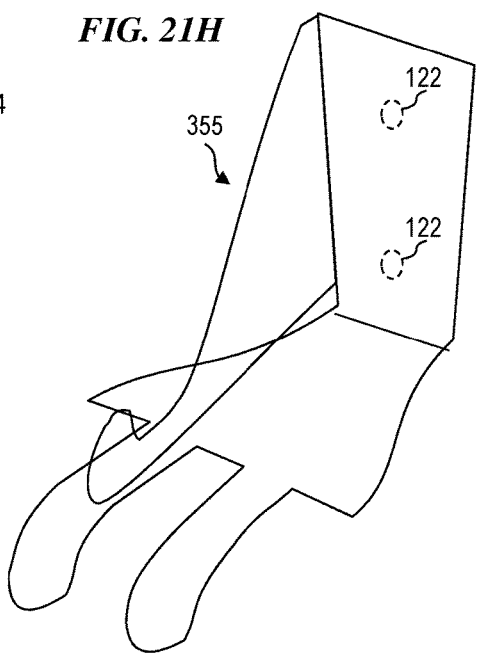
FIG. 21H is a perspective view of one-arm two-finger one-part mug holder 355, according to some embodiments of the present invention.
Figure 21I:
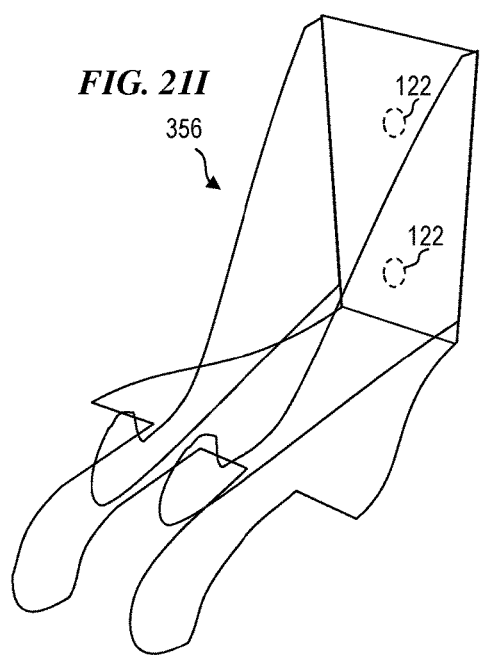
FIG. 21I is a perspective view of two-arm two-finger one-part mug holder 356, according to some embodiments of the present invention.
Figure 21J:
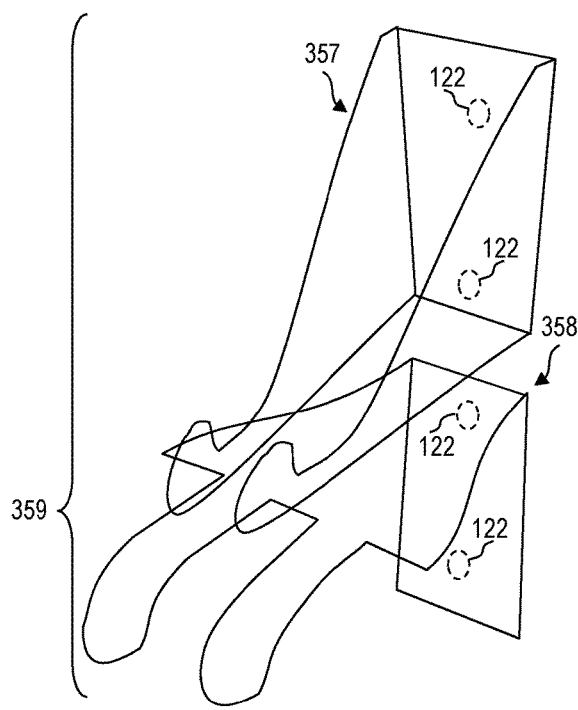
FIG. 21J is a perspective view of two-arm two-finger two-part mug holder 359, according to some embodiments of the present invention.

FIG. 21A is a plan view of two-hook mug support blank 301 useful for making part 358 of two-part holder 359 of FIG. 21J, according to some embodiments of the present invention. In some embodiments, two-hook mug support blank 301 is bent about 90 degrees at fold lines 327 to form mug support 357 of FIG. 21J. In some embodiments, each arm 310 has an angled lower edge configured to clear (be above) the spring finger(s) of the spring-finger section 358 (see FIG. 21J) when the fingers are urged upward by a human user inserting a mug to be held. In some embodiments, the upper edge of each arm includes a depression 314 or 316 into which the mug's handle is placed and an end knob 316 or 317 to retain the mug in depression 314 or 316. In some embodiments, the arms 310 are resilient and the end knobs 316 and 317 can be twisted toward one another and pressed together to facilitate insertion of the knobs 316 and 317 through the opening in the mug's handle. In some embodiments, the arms 310 are bent at fold lines 327 at angles less than 90 degrees (e.g., in some embodiments, between about 70 degrees and about 85 degrees to the wall connection plate 320), such that the arms can be pressed toward one another to insert into the opening in the mug handle and thereafter will spring apart to provide additional spring force holding the mug firmly, but gently, in place.

FIG. 21B is a plan view of two-finger mug tension blank 302 useful for making part 357 of two-part holder 359 of FIG. 21J, according to some embodiments of the present invention. In some embodiments, two-finger mug tension blank 302 is bent about 120 degrees at fold line 347 to form mug tension spring unit 358 of FIG. 21J, wherein the wall-connection plate is below the fingers. In some embodiments, two-finger mug tension blank 302 is bent about 60 degrees at fold line 347 to form mug tension spring unit similar to unit 201 of FIG. 20B, wherein the wall-connection plate is above the fingers. In some embodiments, each spring finger is bent or curved downward to help hold the mug toward the wall to which the holder is attached. In some embodiments, the fingers are resilient and can be pressed toward one another and to facilitate insertion of the fingers through the opening in the mug's handle. In some embodiments, one or more wings 334 and/or 335 and/or a central slot 333 are provided such that the handle of the mug will rest with a plurality of locations on the mug and/or its handle are urged firmly against two or more locations 338, 339, and/or 332 such that the mug does not twist or shift when the mobile dwelling is in motion. In some embodiments, the wings 334 and 335 are made wide enough to accommodate a range of different-sized mug handle openings. In some embodiments, the provision of two or more narrow fingers 134-135 separated by slot(s) 333 (rather than a single finger such as shown in FIG. 21E) allows each spring finger to stretch different amounts in order to conform to various mugs or coffee cups having different shapes. In some embodiments, the distance between fold line 347 and the line connecting wing contact points 338 and 339 and optional contact point 332 is chosen (in combination with the bend angle formed at fold line 347) such that when the mug is inserted into the mug holder, the bowl of the mug will be positioned at about 1-2 cm (⅜ to ¾ inch) from the wall, to prevent banging into the wall during motion of the mobile dwelling and possible damage to the mug (which may be made of ceramic or glass).

FIG. 21C1 is a plan view of two-hook two-finger mug support blank 302C useful for making one-part holder 359C of FIG. 21C2, according to some embodiments of the present invention.

FIG. 21C2 is a side view of two-hook two-finger mug holder 359C made from two-hook two-finger mug support blank 302C of FIG. 21C1, according to some embodiments of the present invention.

FIG. 21D1 is a plan view of one-arm two-finger mug support blank 304 useful for making one-part holder 354 of FIG. 21G, according to some embodiments of the present invention. In some embodiments, the single-piece one-arm two-finger mug support blank 304 functions as the combination of blank 301 of FIG. 21A (but with only one arm) and blank 302 of FIG. 21B. The resulting single-piece mug holder after folding at lines 327 and 347 offers the advantage of a single wall attachment, and having only a single arm that needs to be inserted through the mug handle as shown in FIG. 21G (which may be easier than having to press and twist two arms together as is the case with the devices of FIG. 21I and FIG. 21J) and in contrast to the advantage of having two arms that spread apart after insertion through the mug handle that may provide sturdier resistance to mug movement as is the case with the devices of FIG. 21I and FIG. 21J.

FIG. 21D2 is a plan view of single-piece two-arm two-finger mug support blank 303 useful for making one-part holder 359 of FIG. 21I, according to some embodiments of the present invention. In some embodiments, the single-piece two-arm two-finger mug support blank 303 functions as the combination of blank 301 of FIG. 21A and blank 302 of FIG. 21B. The resulting single-piece mug holder after folding at lines 327 and 347 offers the advantage of a single wall attachment, in contrast to the advantages of allowing the end-user to choose different spacings between the two wall-mounting locations provided by the two-piece set 359 of FIG. 21J.

FIG. 21E is a plan view of two-arm one-finger mug support blank 305 useful for making one-part holder 359 of FIG. 21I, according to some embodiments of the present invention. This alternative embodiment of the present invention provides at least two contact points to the mug handle at notch-depression 314 and/or knob 316 in each arm 310, as well as two contact points to the mug handle at wing contact points 338 and 339 and finger contact point 336.

FIG. 21F is a plan view of one-finger mug tension blank 306 useful for making the bottom (single-finger) portion of a two-part holder similar to 359 of FIG. 21J, according to some embodiments of the present invention.

FIG. 21G is a perspective view of one-arm two-finger one-part mug holder 354, holding a mug 97, according to some embodiments of the present invention. In some embodiments, mug 97 has a plurality of contact points between the handle of mug 97 and the contact points 338 and 339 (see FIG. 21D1), a plurality of contact points between the bowl of mug 97 and the contact points 337 and 336 (see FIG. 21D1), and one or more contact points between the handle of mug 97 and the support arm 319 (e.g., 314 and/or 316; see FIG. 21D1), FIG. 21H is a perspective view of one-arm two-finger one-part mug holder 355 shown without the mug 97, according to some embodiments of the present invention.

FIG. 21I is a perspective view of two-arm two-finger one-part mug holder 356 shown without the mug 97, according to some embodiments of the present invention.

FIG. 21J is a perspective view of two-arm two-finger two-part mug holder 359 shown without the mug 97, according to some embodiments of the present invention.

Figure 22:
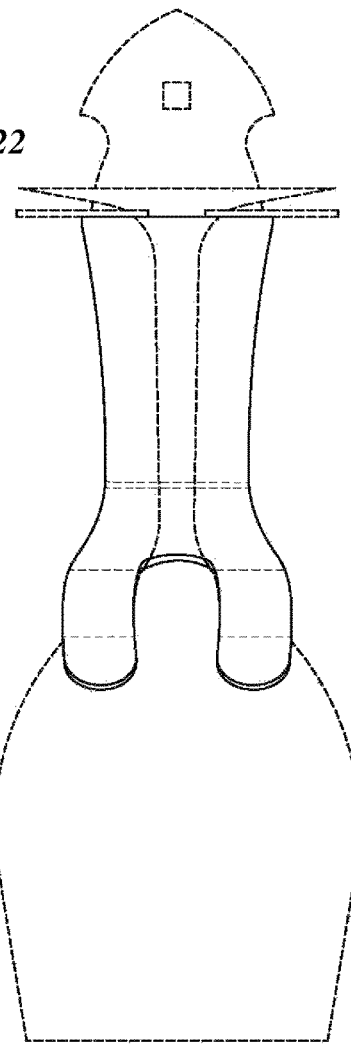
FIG. 22 is a front view of a decorative curved two-part holder 200 (see FIG. 20A) for a stemware-type beverage vessel according to some embodiments of the present invention.

FIG. 22 is a front view of a decorative curved two-part holder 200 (see FIG. 20A) for a stemware-type beverage vessel according to some embodiments of the present invention.

Figure 23:
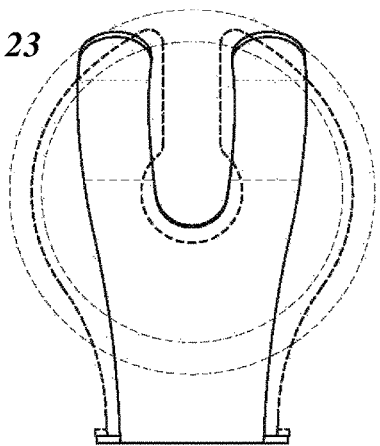
FIG. 23 is a bottom view of decorative curved two-part holder 200 according to some embodiments of the present invention.

FIG. 23 is a bottom view of decorative curved two-part holder 200 according to some embodiments of the present invention.

Figure 24:
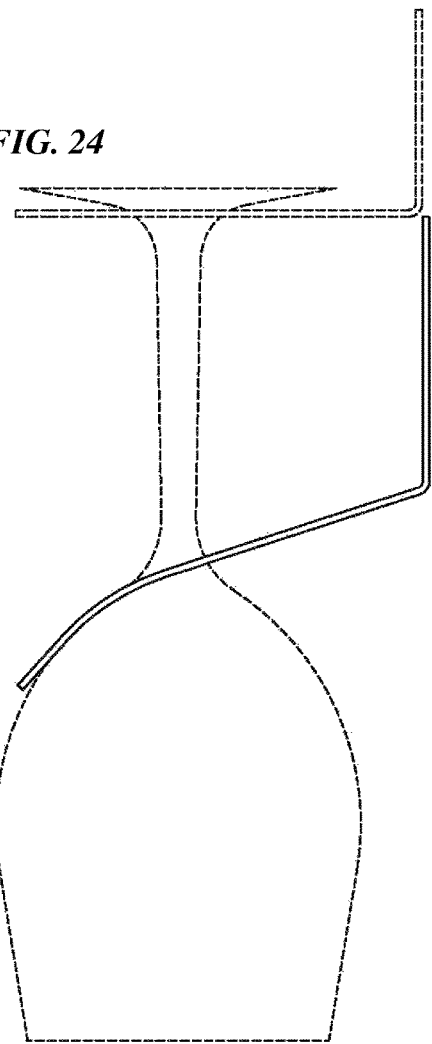
FIG. 24 is a left-side view of decorative curved two-part holder 200 according to some embodiments of the present invention.

FIG. 24 is a left-side view of decorative curved two-part holder 200 according to some embodiments of the present invention.

Figure 25:
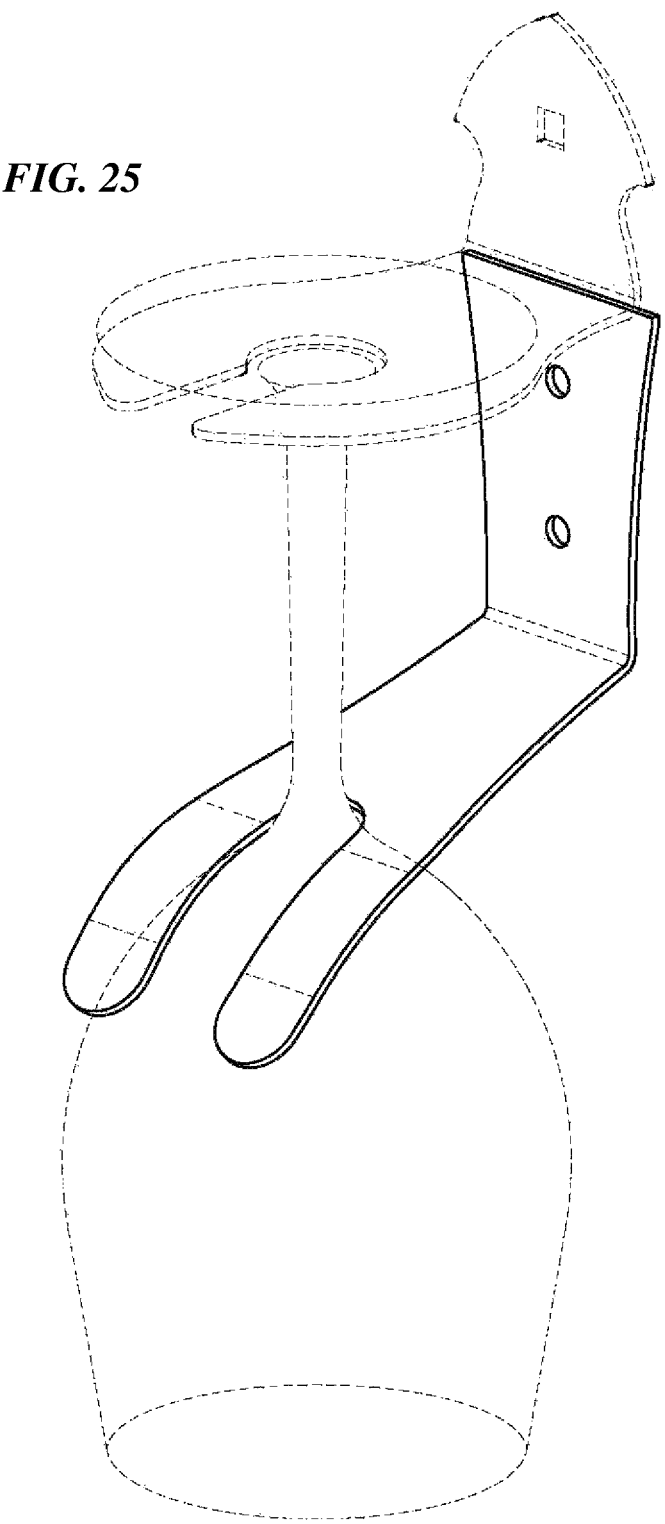
FIG. 25 is a perspective view of decorative curved two-part holder 200 according to some embodiments of the present invention.

FIG. 25 is a perspective view of decorative curved two-part holder 200 according to some embodiments of the present invention.

Figure 26:
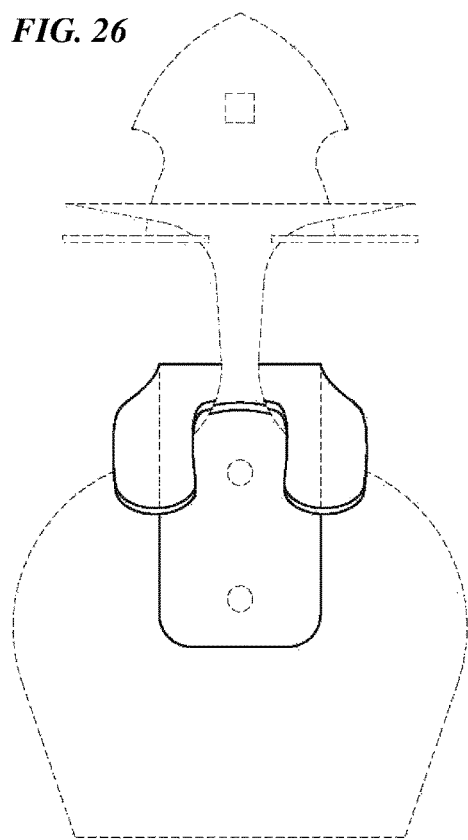
FIG. 26 is a front view of a decorative curved two-part holder 203 (see FIG. 20C) for a stemware-type beverage vessel according to some embodiments of the present invention.

FIG. 26 is a front view of a decorative curved two-part holder 203 (see FIG. 20C) for a stemware-type beverage vessel according to some embodiments of the present invention.

Figure 27:
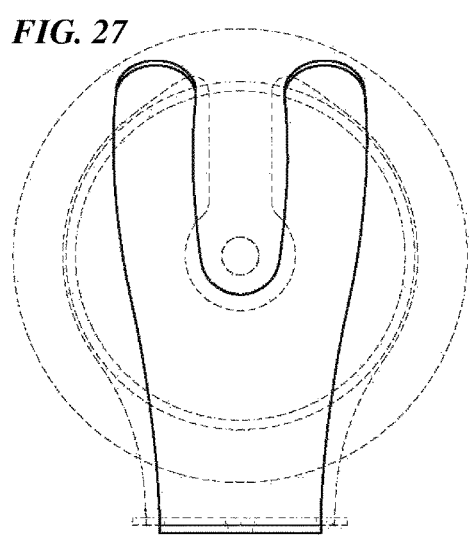
FIG. 27 is a bottom view of decorative curved two-part holder 203 according to some embodiments of the present invention.

FIG. 27 is a bottom view of decorative curved two-part holder 203 according to some embodiments of the present invention.

Figure 28:
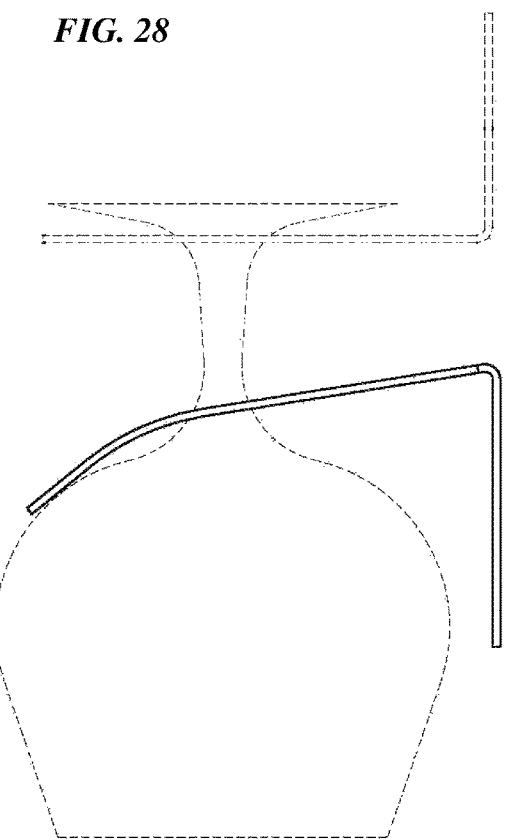
FIG. 28 is a left-side view of decorative curved two-part holder 203 according to some embodiments of the present invention.

FIG. 28 is a left-side view of decorative curved two-part holder 203 according to some embodiments of the present invention.

Figure 29:
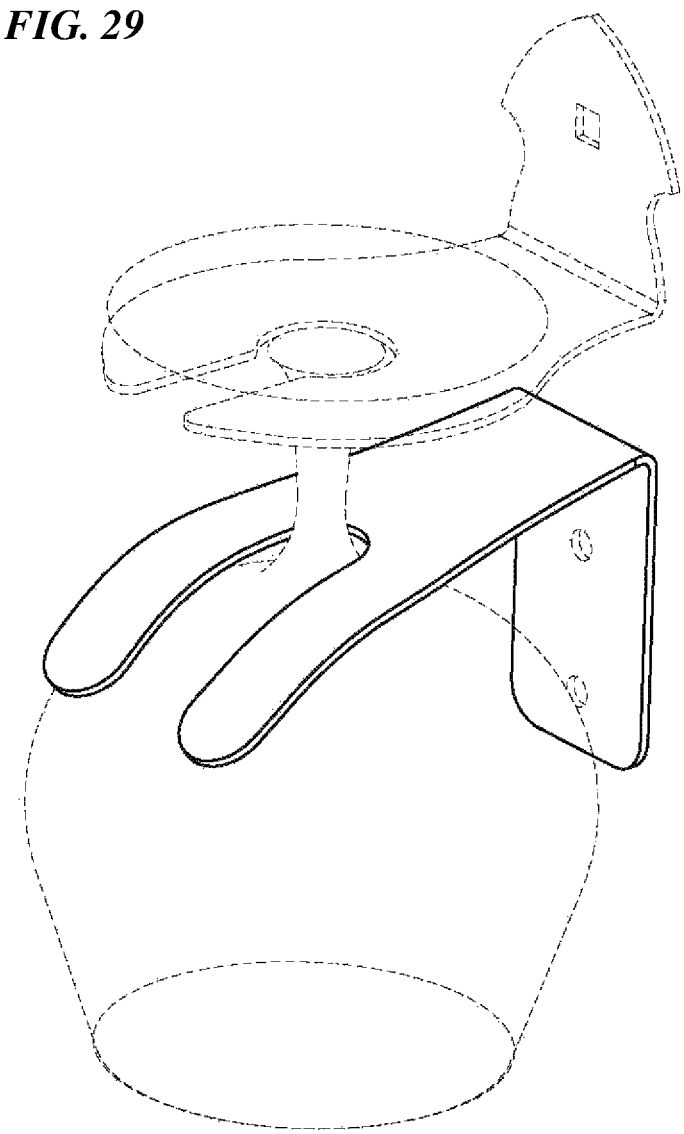
FIG. 29 is a perspective view of decorative curved two-part holder 203 according to some embodiments of the present invention.

FIG. 29 is a perspective view of decorative curved two-part holder 203 according to some embodiments of the present invention.

FIG. 30 is a front view of a decorative bent one-arm two-finger one-part holder 400 for a coffee-mug-type beverage vessel according to some embodiments of the present invention.

FIG. 31 is a bottom view of decorative bent one-part holder 400 according to some embodiments of the present invention.

FIG. 32 is a left-side view of decorative bent one-part holder 400 according to some embodiments of the present invention.

Figure 33:
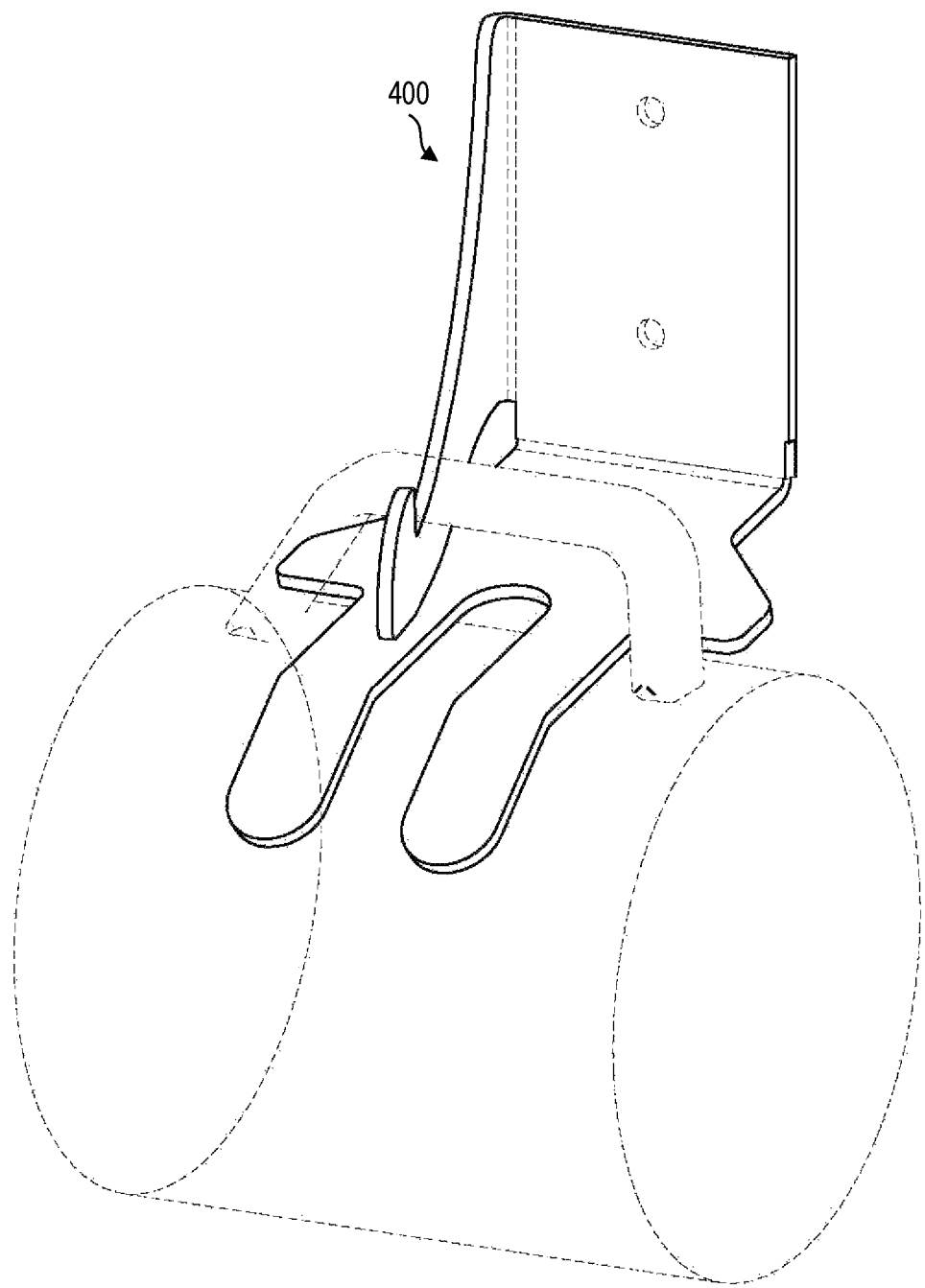
FIG. 33 is a perspective view of decorative bent one-part holder 400 according to some embodiments of the present invention.

FIG. 33 is a perspective view of decorative bent one-part holder 400 according to some embodiments of the present invention.

Figure 34:
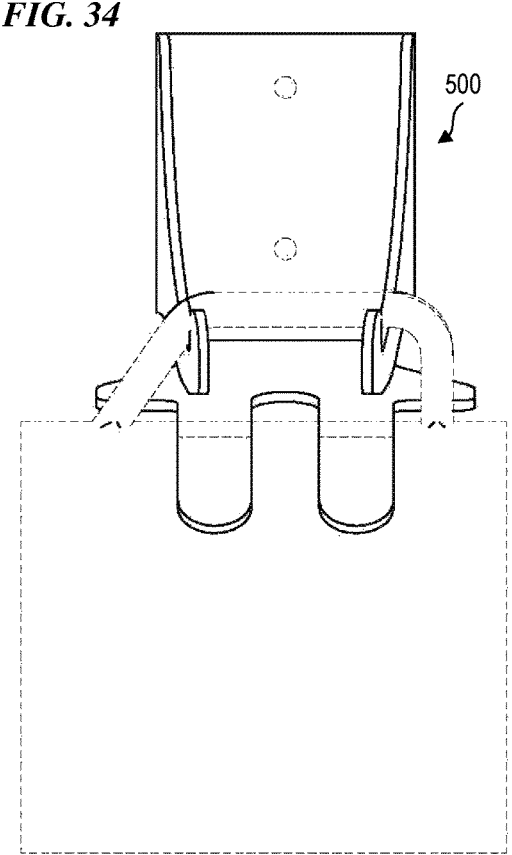
FIG. 34 is a front view of a decorative bent one-arm two-finger one-part holder 500 for a coffee-mug-type beverage vessel according to some embodiments of the present invention.

FIG. 34 is a front view of a decorative bent one-arm two-finger one-part holder 500 for a coffee-mug-type beverage vessel according to some embodiments of the present invention.

Figure 35:
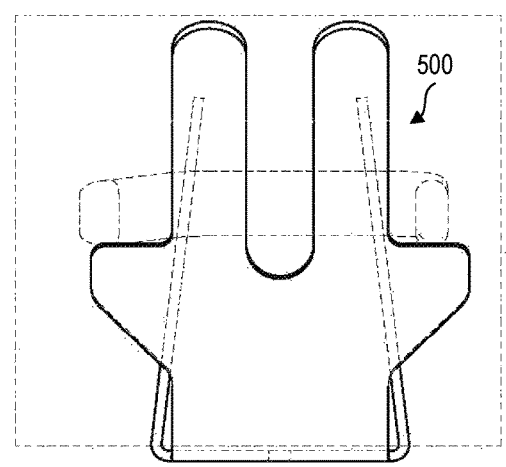
FIG. 35 is a bottom view of decorative bent one-part holder 500 according to some embodiments of the present invention.

FIG. 35 is a bottom view of decorative bent one-part holder 500 according to some embodiments of the present invention.

Figure 36:
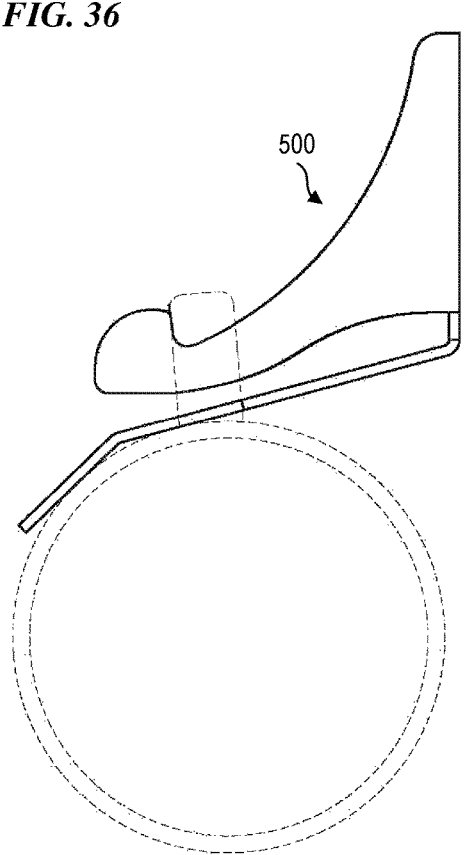
FIG. 36 is a left-side view of decorative bent one-part holder 500 according to some embodiments of the present invention.

FIG. 36 is a left-side view of decorative bent one-part holder 500 according to some embodiments of the present invention.

Figure 37:
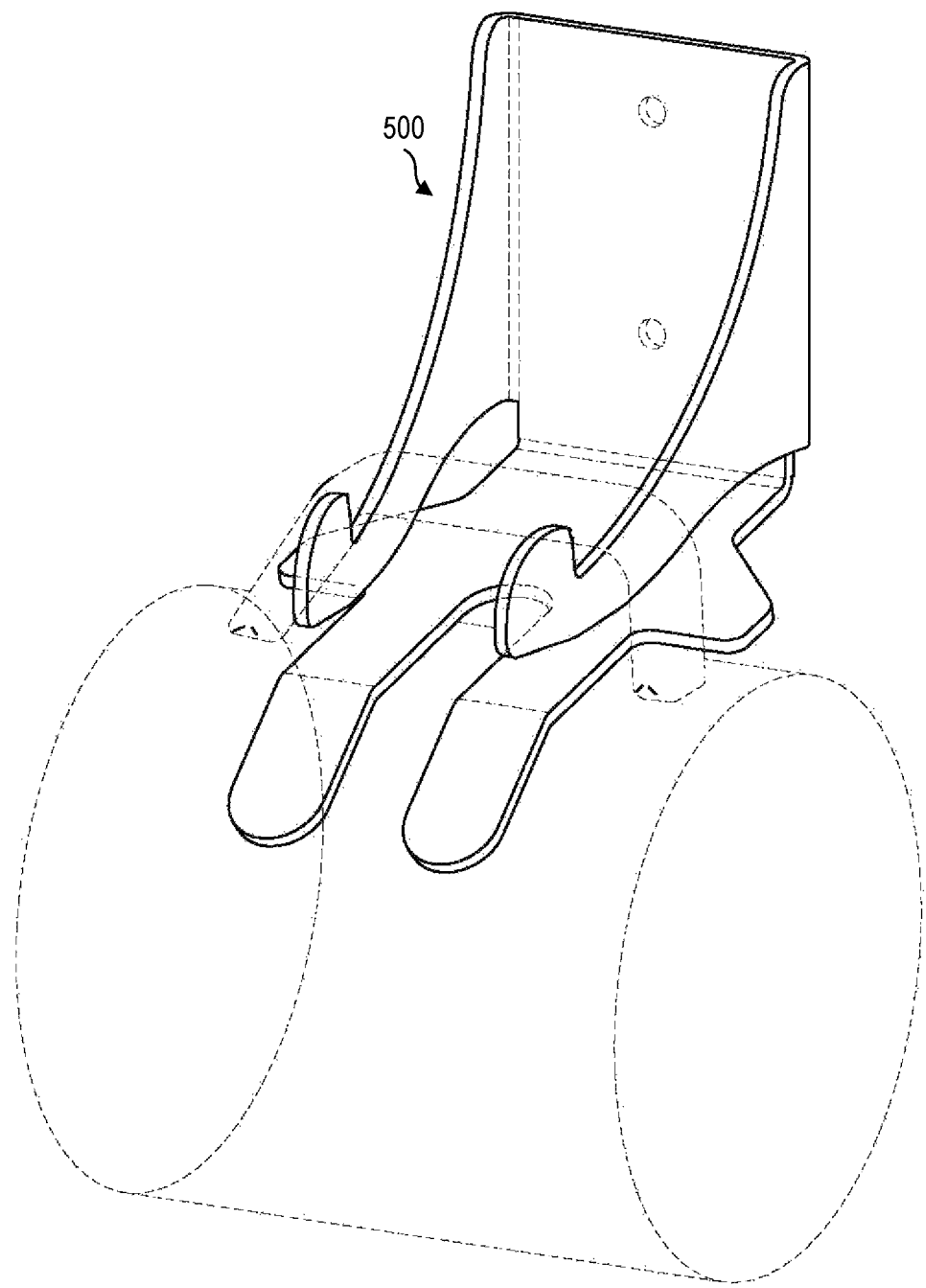
FIG. 37 is a perspective view of decorative bent one-part holder 500 according to some embodiments of the present invention.

FIG. 37 is a perspective view of decorative bent one-part holder 500 according to some embodiments of the present invention.

Figure 38:
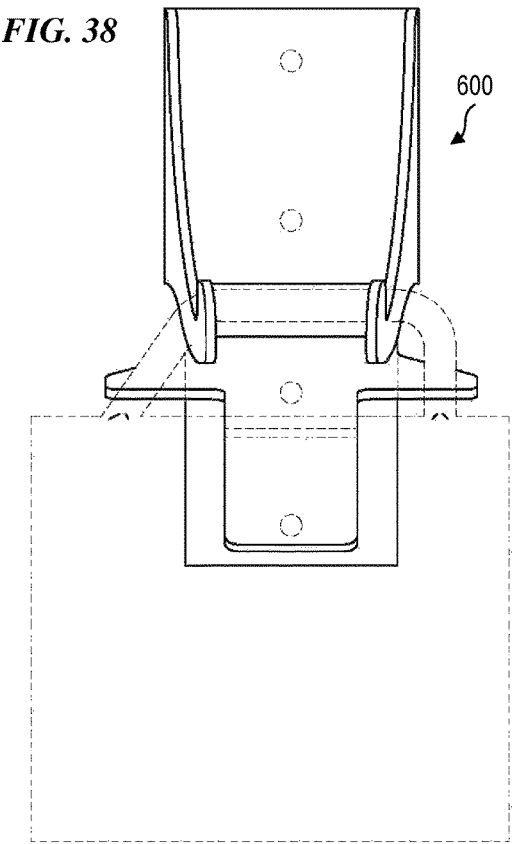
FIG. 38 is a front view of a decorative bent two-arm one-finger two-part holder 600 for a coffee-mug-type beverage vessel according to some embodiments of the present invention.

FIG. 38 is a front view of a decorative bent two-arm one-finger two-part holder 600 for a coffee-mug-type beverage vessel according to some embodiments of the present invention.

Figure 39:
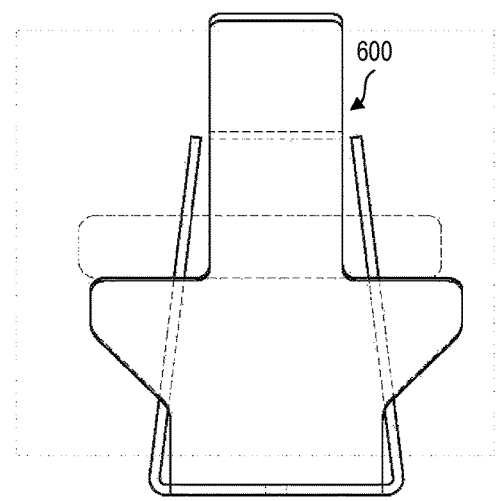
FIG. 39 is a bottom view of decorative bent one-part holder 600 according to some embodiments of the present invention.

FIG. 39 is a bottom view of decorative bent one-part holder 600 according to some embodiments of the present invention.

Figure 40:
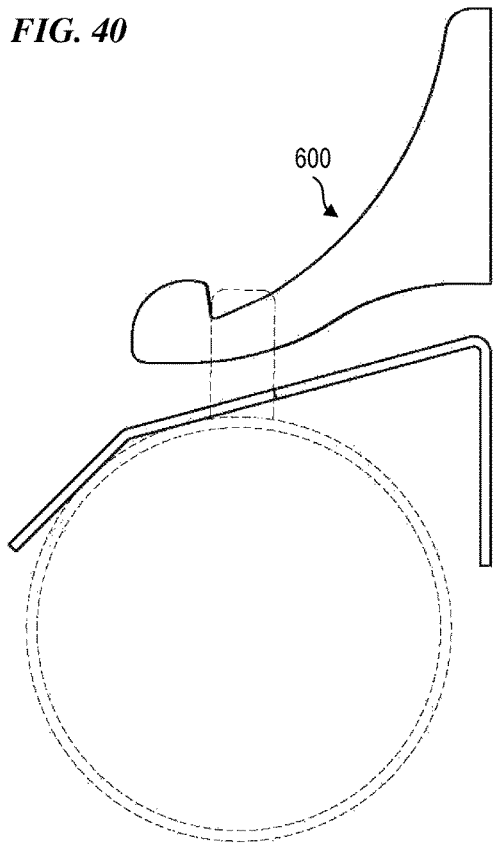
FIG. 40 is a left-side view of decorative bent one-part holder 600 according to some embodiments of the present invention.

FIG. 40 is a left-side view of decorative bent one-part holder 600 according to some embodiments of the present invention.

Figure 41:
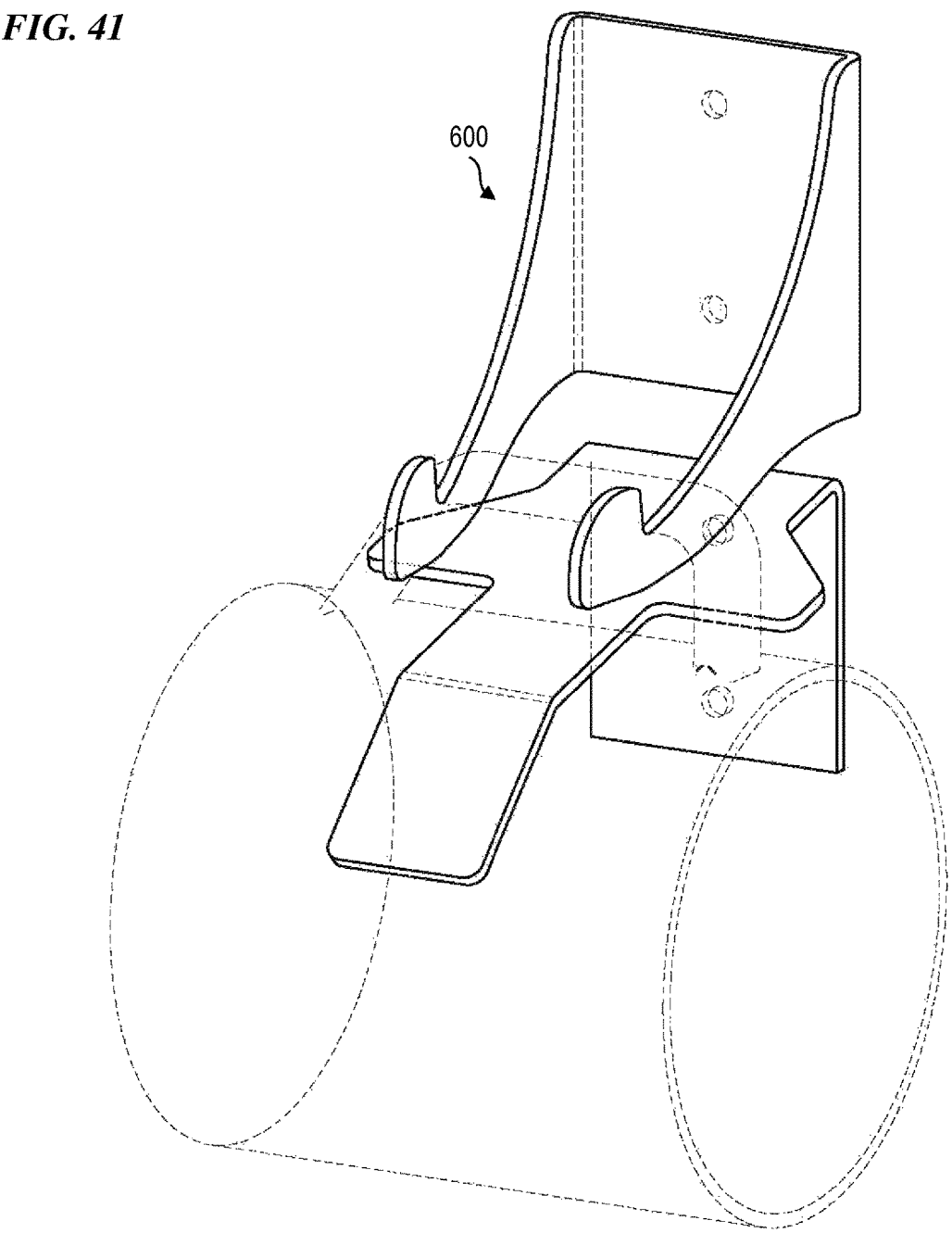
FIG. 41 is a perspective view of decorative bent one-part holder 600 according to some embodiments of the present invention.

FIG. 41 is a perspective view of decorative bent one-part holder 600 according to some embodiments of the present invention.

Figure 42:
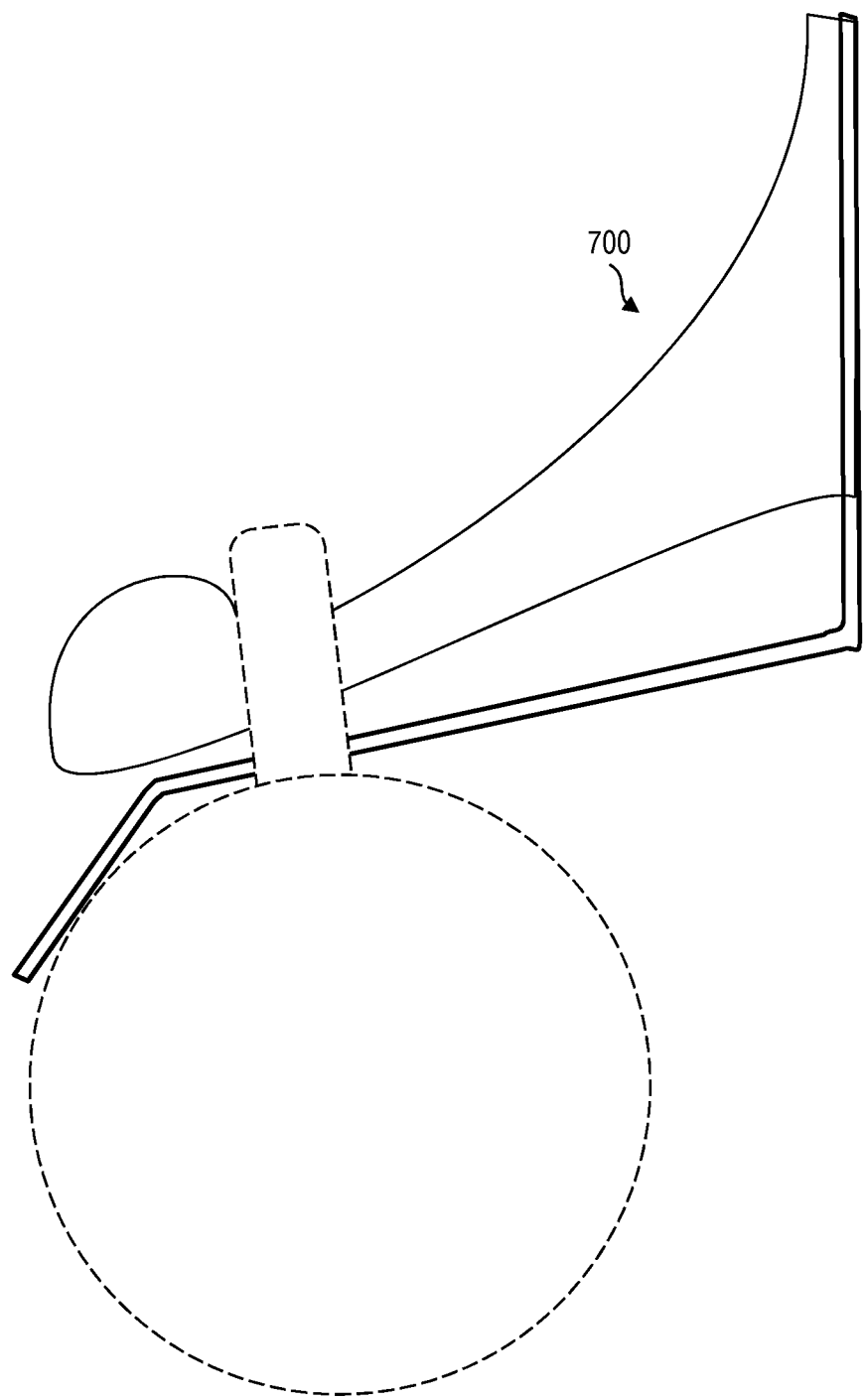
FIG. 42 is a left-side view of decorative bent one-part holder 700 according to some embodiments of the present invention.

FIG. 42 is a left-side view of decorative bent one-part holder 700 according to some embodiments of the present invention.

FIG. 43 is a plan view of a blank for a two-part holder 800 (see FIG. 44) according to some embodiments of the present invention.

FIG. 44 is a left-side view of a decorative bent two-part holder 800 according to some embodiments of the present invention.

Figure 45:
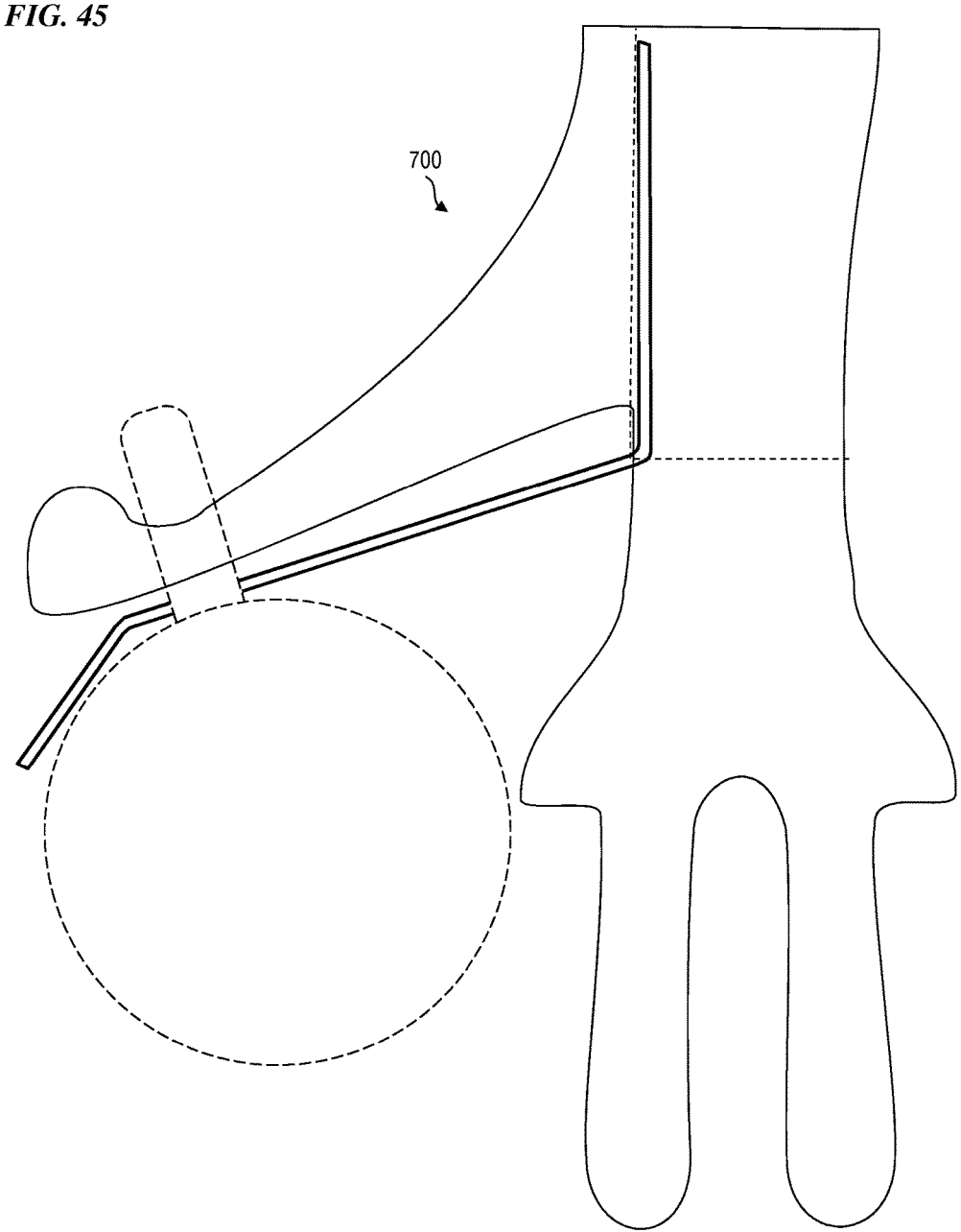
FIG. 45 is a plan view and a left-side view of a decorative bent one-part holder 700 according to some embodiments of the present invention.

FIG. 45 is a plan view and a left-side view of a decorative bent one-part holder 700 according to some embodiments of the present invention.

In some embodiments, the present invention provides a beverage-vessel holder that includes a first support structure that holds a first portion of a beverage vessel, a wall-connection plate configured to attach to a wall, and a plurality of resilient fingers that extend outward from the wall-connection plate and that press against a second portion of the beverage vessel to gently urge the beverage vessel toward the wall and into the first support structure to help the beverage vessel remain held by the first support structure and the plurality of resilient fingers.

Descriptions for Stemware Versions:

In some embodiments of the beverage-vessel holder, the beverage vessel is a glass stemware beverage vessel, such as a wine glass, snifter, goblet or the like, that has a base, a globe for holding a beverage, and a stem that connects the base to the globe, wherein the first support structure includes an open-ended keyhole-shaped support-structure slot that widens at the internal terminus of the support-structure slot for receiving a first base portion of the stem of the stemware beverage vessel, and wherein the plurality of fingers include two springy finger-like extensions that are separated by a finger slot that extend on either side of a second globe-end portion of the stem and that press against a plurality of locations on the globe portion of the stemware beverage vessel to urge the second opposite-end portion of the stem into contact with an interior end of the slot formed between the two springy finger-like extensions, and to urge the first base portion of the stem into the widened internal terminus of the keyhole-shaped slot of the first support structure. In some embodiments, the first support structure and plurality of fingers, as well as a first wall-connection plate, are formed of a single piece of resilient material such as a polycarbonate polymer or other suitable material. In other embodiments, the plurality of fingers and the first wall-connection plate are formed of a first single piece of resilient material such as a polycarbonate polymer or other suitable material, and the first support structure and a second wall-connection plate are formed of a single piece of material, which may include plate steel, a polycarbonate polymer or other suitable material.

Descriptions for Coffee-Cup Versions:

In some other embodiments, the beverage vessel is a coffee-cup-like beverage vessel having a handle connected to a cup portion of the vessel at both of two ends of the handle, wherein the first support structure includes a hook-shaped extension that widens at the distal end of the extension for inserting into the handle of the coffee-cup-like beverage vessel to support the weight of the coffee-cup-like beverage vessel, and wherein the plurality of fingers include two springy finger-like extensions with wing-like side extensions, wherein at least one of the two springy finger-like extensions extends through the interior opening of the handle, and wherein the two springy finger-like extensions press against a plurality of locations on the cup portion of the coffee-cup-like beverage vessel to urge the handle into contact with either an interior end of the slot formed between the two springy finger-like extensions and with one or both of the wing-like side extensions of the two springy finger-like extensions, and to urge the handle into the hook-shaped extension of the first support structure. In some embodiments, the first support structure and plurality of fingers, as well as a first wall-connection plate, are formed of a single piece of resilient material such as a polycarbonate polymer or other suitable material (for example, in some such embodiments, the first support structure includes a planar portion forming a vertical wall extending outward from a first vertical edge of the first wall-connection plate, while in other embodiments, an optional second support structure is provided that includes a planar portion forming a vertical wall extending outward from a second vertical edge of the first wall-connection plate). In other embodiments, the plurality of fingers and the first wall-connection plate are formed of a first single piece of resilient material such as a polycarbonate polymer or other suitable material, and the first support structure (and optionally the optional second support structure) and a second wall-connection plate are formed of a second single piece of material, which may include plate steel, a polycarbonate polymer or other suitable material, The holders of the present invention for holding coffee-cup-like beverage vessels (cups and mugs) shown in FIGS. 21A-21J that holds two portions of the handle in the same manner as the spring-loaded lower parts 134 and 135 hold the single stem of the wine glass 91, with the spring fingers wrapping part way around the cup 81, and with one or two hook-like extensions replacing the keyhole slot of the stemware version to hook and support the upper edge of the handle of the coffee-cup-like beverage vessel. Note that for cups with LARGE handles, both spring-fingers 334 and 335 are inserted through the handle and the outer wing-extensions 336 and 337 press against two locations on the handle (just like the deep part of the slot 133 presses against the wine-glass stem 93) to hold the cup 81 away from banging against the wall of the mobile dwelling. Similarly, for cups with SMALL handles, only one spring-finger (e.g., 336 OR 337) is inserted through the handle and one outer wing-extension presses against one location on the handle and the deep end of the slot 333 presses against another location on the handle (just like the deep part 132 of the slot 133 presses against the wine-glass stem 93) to hold the cup 81 away from banging against the wall.

In some embodiments, the present invention provides a method for securely holding and presenting a beverage vessel, the method including: providing a holding mechanism that includes a wall-connection plate that defines a plane of a wall, a plurality of resilient fingers that extend outward from the wall-connection plate, and a first support structure; hanging a first portion of a beverage vessel from the support structure, and pressing the plurality of resilient fingers against a second portion of the beverage vessel in a direction at least partially toward the plane of the wall and at least partially away from the support structure to help the beverage vessel remain held by the first support structure and the plurality of resilient fingers.

I claim:

1. An apparatus for securely holding and presenting a beverage vessel, the apparatus comprising:
   a first wall-connection plate that defines a wall-interface plane relative to a wall, wherein the first wall-connection plate is configured to be connected to the wall;
   means for hanging a first portion of the beverage vessel from the wall; and
   means, coupled to the first wall-connection plate, for pulling a second portion of the beverage vessel in a direction at least partially toward the plane of the wall and at least partially into the means for hanging, wherein the means for pulling a second portion of the beverage vessel and the means for hanging apply a tension force to the beverage vessel.

2. A beverage-vessel holder comprising:
   a first wall-connection plate configured to attach to a wall;
   a first support structure that holds a first portion of a beverage vessel; and
   a plurality of resilient fingers that extend outward from the first wall-connection plate and that press against a second portion of the beverage vessel to urge the beverage vessel toward the wall and into the first support structure, in order to hold the beverage vessel by the first support structure and the plurality of resilient fingers,
   wherein the plurality of resilient fingers and the first support structure apply a tension force to the beverage vessel.

3. The beverage-vessel holder of claim 2,
   wherein the beverage vessel is a glass stemware beverage vessel that has a base, a globe for holding a beverage, and a stem that connects the base to the globe,
   wherein the first support structure includes an open-ended keyhole-shaped support-structure slot that widens at the internal terminus of the support-structure slot for receiving a first base portion of the stem of the stemware beverage vessel, and wherein the plurality of fingers include two springy finger extensions that are separated by a finger slot that extend on either side of a second globe-end portion of the stem and that press against a plurality of locations on the globe portion of the stemware beverage vessel to urge the second opposite-end portion of the stem into contact with an interior end of the slot formed between the two springy finger extensions, and to urge the first base portion of the stem into the widened internal terminus of the keyhole-shaped slot of the first support structure.

4. The beverage-vessel holder of claim 2,
wherein the beverage vessel is a glass stemware wine glass that has a base, a globe for holding a beverage, and a stem that connects the base to the globe,
wherein the first support structure includes an open-ended keyhole-shaped support-structure slot that widens at the internal terminus of the support-structure slot for receiving a first base portion of the stem of the stemware beverage vessel, and
wherein the plurality of fingers include two springy finger extensions that are separated by a finger slot that extend on either side of a second globe-end portion of the stem and that press against a plurality of locations on the globe portion of the stemware beverage vessel to urge the second opposite-end portion of the stem into contact with an interior end of the slot formed between the two springy finger extensions, and to urge the first base portion of the stem into the widened internal terminus of the keyhole-shaped slot of the first support structure.

5. The beverage-vessel holder of claim 2, wherein the wall is part of a vehicle, and wherein the beverage-vessel holder is configured to hold the beverage vessel away from banging against the wall when the vehicle moves.

6. The beverage-vessel holder of claim 2, wherein the first support structure and plurality of fingers, as well as the first wall-connection plate, are formed of a single piece of resilient material.

7. The beverage-vessel holder of claim 2, wherein the first support structure and plurality of fingers, as well as the first wall-connection plate, are formed of a single piece of a polymer that includes a polycarbonate.

8. The beverage-vessel holder of claim 2, wherein the plurality of fingers and the first wall-connection plate are formed of a first single piece of resilient material, and the first support structure and a second wall-connection plate are formed of a second single piece of material.

9. The beverage-vessel holder of claim 2, wherein the plurality of fingers and the first wall-connection plate are formed of a single piece of a polycarbonate polymer, and the first support structure and a second wall-connection plate are formed of a single piece of steel.

10. The beverage-vessel holder of claim 2,
wherein the beverage vessel is a ceramic mug having a handle connected to a cup portion of the vessel at both of two ends of the handle,
wherein the first support structure includes a hook-shaped extension that widens at the distal end of the extension for inserting into the handle of the mug to support the weight of the mug,
wherein the plurality of fingers include two springy finger extensions with wing side extensions,
wherein at least one of the two springy finger extensions extends through the interior opening of the handle, and
wherein the two springy finger extensions press against a plurality of locations on the cup portion of the mug to urge the handle into contact with either an interior end of the slot formed between the two springy finger extensions and with one or both of the wing side extensions of the two springy finger extensions, and to urge the handle into the hook-shaped extension of the first support structure.

11. The beverage-vessel holder of claim 10, wherein the first support structure and plurality of fingers, as well as the first wall-connection plate, are formed of a single piece of resilient material.

12. The beverage-vessel holder of claim 10, wherein the first support structure includes a planar portion forming a vertical wall extending outward from a first vertical edge of the first wall-connection plate.

13. The beverage-vessel holder of claim 10, further comprising a second support structure that includes a planar portion forming a vertical wall extending outward from a second vertical edge of the first wall-connection plate.

14. The beverage-vessel holder of claim 2, wherein the wall is part of a vehicle, wherein the beverage-vessel holder is configured to hold the beverage vessel away from banging against the wall when the vehicle moves, and wherein the first support structure and plurality of fingers, as well as the first wall-connection plate, are formed of a single piece of resilient material.

15. A method for securely holding and presenting a beverage vessel, the method comprising:
providing a holding mechanism that includes a first wall-connection plate that defines an wall-interface plane relative to a wall, a plurality of resilient fingers that extend outward from the wall-connection plate, and a first support structure;
pressing a second portion of a beverage vessel against the plurality of resilient fingers in a direction at least partially away from the plane of the wall and at least partially toward the first support structure;
hanging a first portion of the beverage vessel from the first support structure;
releasing the beverage vessel such that the plurality of resilient fingers pull the beverage vessel into the first support structure to help the beverage vessel remain held by the first support structure and the plurality of resilient fingers, wherein the releasing of the beverage vessel applies a tension force to the beverage vessel.

16. The method of claim 15,
wherein the beverage vessel is a glass stemware beverage vessel that has a base, a globe for holding a beverage, and a stem that connects the base to the globe,
wherein the first support structure includes an open-ended keyhole-shaped support-structure slot that widens at the internal terminus of the support-structure slot for receiving a first base portion of the stem of the stemware beverage vessel, and wherein the plurality of fingers include two springy finger extensions that are separated by a finger slot that extend on either side of a second globe-end portion of the stem and that press against a plurality of locations on the globe portion of the stemware beverage vessel to urge the second opposite-end portion of the stem into contact with an interior end of the slot formed between the two springy finger extensions, and to urge the first base portion of the stem into the widened internal terminus of the keyhole-shaped slot of the first support structure.

17. The method of claim 15,
wherein the beverage vessel is a glass stemware wine glass that has a base, a globe for holding a beverage, and a stem that connects the base to the globe,
wherein the first support structure includes an open-ended keyhole-shaped support-structure slot that widens at the internal terminus of the support-structure slot for receiving a first base portion of the stem of the stemware beverage vessel, and
wherein the plurality of fingers include two springy finger extensions that are separated by a finger slot that extend on either side of a second globe-end portion of the stem and that press against a plurality of locations on the globe portion of the stemware beverage vessel to urge the second opposite-end portion of the stem into contact with an interior end of the slot formed between the two springy finger extensions, and to urge the first base portion of the stem into the widened internal terminus of the keyhole-shaped slot of the first support structure.

18. The method of claim 15, wherein the wall is part of a vehicle, and wherein the beverage-vessel holder is configured to hold the beverage vessel away from banging against the wall when the vehicle moves.

19. The method of claim 15, wherein the providing the holding mechanism includes: molding the first support structure and plurality of fingers and the first wall-connection plate of a single piece of resilient material.

20. The method of claim 15, wherein the providing the holding mechanism includes:

forming the plurality of fingers and the first wall-connection plate of a first single piece of resilient material, and forming the first support structure and a second wall-connection plate of a second single piece of material.

21. The method of claim 15, wherein the beverage vessel is a ceramic mug having a handle connected to a cup portion of the vessel at both of two ends of the handle, wherein the first support structure includes a hook-shaped extension that widens at the distal end of the extension for inserting into the handle of the mug to support the weight of the mug, wherein the plurality of fingers include two springy finger extensions with wing side extensions, wherein at least one of the two springy finger extensions extends through the interior opening of the handle, and wherein the two springy finger extensions press against a plurality of locations on the cup portion of the mug to urge the handle into contact with either an interior end of the slot formed between the two springy finger extensions and with one or both of the wing side extensions of the two springy finger extensions, and to urge the handle into the hook-shaped extension of the first support structure.

22. The method of claim 15, wherein the wall is part of a vehicle, and wherein the beverage-vessel holder is configured to hold the beverage vessel away from banging against the wall when the vehicle moves, and wherein the providing of the holding mechanism includes molding the first support structure and plurality of fingers and the first wall-connection plate of a single piece of resilient material.

* * * * *